(12) United States Patent
Xiang

(10) Patent No.: US 9,431,916 B2
(45) Date of Patent: Aug. 30, 2016

(54) POWER SUPPLY BUS CIRCUIT

(71) Applicant: Huawei Technologies Co., Ltd., Shenzhen (CN)

(72) Inventor: Zhiqiang Xiang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/706,604

(22) Filed: May 7, 2015

(65) Prior Publication Data

US 2015/0326104 A1    Nov. 12, 2015

(30) Foreign Application Priority Data

May 7, 2014    (CN) .......................... 2014 1 0190391

(51) Int. Cl.
| | |
|---|---|
| *H02M 3/335* | (2006.01) |
| *H02M 1/088* | (2006.01) |
| *H02M 3/337* | (2006.01) |
| *H02M 1/00* | (2006.01) |
| *H02M 3/158* | (2006.01) |

(52) U.S. Cl.
CPC .......... *H02M 3/33576* (2013.01); *H02M 1/088* (2013.01); *H02M 3/337* (2013.01); *H02M 3/158* (2013.01); *H02M 2001/007* (2013.01); *H02M 2001/008* (2013.01); *H02M 2001/0048* (2013.01)

(58) Field of Classification Search
CPC ....... H02M 3/24; H02M 3/285; H02M 3/335; H02M 3/33507; H02M 3/33523; H02M 3/3353; H02M 3/33561; H02M 3/33569; H02M 3/33576; H02M 3/33592; H02M 3/3374

USPC ....................................... 363/15–17; 323/266
See application file for complete search history.

(56) References Cited

U.S. PATENT DOCUMENTS 9,276,487 B2 *   3/2016   Ertan ..................... H02M 5/458

FOREIGN PATENT DOCUMENTS

| CN | 201072438 Y | 6/2008 |
| CN | 101753040 A | 6/2010 |
| CN | 101814827 A | 8/2010 |
| CN | 101888186 A | 11/2010 |

OTHER PUBLICATIONS

Partial English Translation and Abstract of Chinese Patent Application No. CN101753040, Dec. 9, 2015, 4 pages.
Foreign Communication From a Counterpart Application, Chinese Application No. 201410190391.8, Chinese Office Action dated Oct. 29, 2015, 6 pages.

* cited by examiner

*Primary Examiner* — Gary L Laxton
(74) *Attorney, Agent, or Firm* — Conley Rose, P.C.; Grant Rodolph; Nicholas K. Beaulieu

(57) ABSTRACT

A power supply bus circuit, includes a voltage regulator circuit, and an impedance isolation circuit, and further including one or more voltage adjustment circuits, where the voltage regulator circuit receives a direct current signal, adjusts a voltage of the direct current signal to a first preset voltage, and outputs a direct current signal of the first preset voltage to the impedance isolation circuit; the impedance isolation circuit receives the direct current signal of the first preset voltage, adjusts the direct current signal of the first preset voltage to an alternating current signal, and outputs, by using a transformer, the alternating current signal in an isolated way and converts the alternating current signal that is output in an isolated way to an isolated direct current signal, and outputs the isolated direct current signal to the voltage adjustment circuit.

13 Claims, 6 Drawing Sheets

POWER SUPPLY BUS CIRCUIT

CROSS-REFERENCE TO RELATED APPLICATION

This application claims priority to Chinese Patent Application No. 201410190391.8, filed on May 7, 2014, which is hereby incorporated by reference in its entirety.

TECHNICAL FIELD

The present invention relates to circuit structures, and in particular, to a power supply bus circuit.

BACKGROUND

In the prior art, when there are multiple load modules (a load module may be an electronic device, or may be a circuit) in a device, a power supply bus circuit needs to be used, and the power supply bus circuit includes a direct current to direct current (DC-DC) conversion circuit and a voltage adjustment circuit that are successively connected. The DC-DC conversion circuit provides a direct current signal of a steady voltage; and then, the voltage adjustment circuit performs voltage adjustment according to different voltages required by different load modules. It may be seen that a premise to ensure a steady electric signal provided by the voltage adjustment circuit is that the DC-DC conversion circuit outputs a constant direct current signal.

As shown in FIG. 1, a direct current ranging from 36 volts to 72 volts is adjusted to a direct current signal of a constant voltage by using the DC-DC conversion circuit, and the direct current signal of the constant voltage is used to supply power to each load module. When voltage transformation is performed on a direct current signal ranging from 36 volts to 72 volts, a duty cycle of a pulse width modulation (PWM) signal used to control both the twenty-third N-type metal-oxide-semiconductor (NMOS) transistor Q23 and the twenty-fifth NMOS transistor Q25 needs to be adjusted in real time, and a duty cycle of a PWM signal used to control both the twenty-fourth NMOS transistor Q24 and the twenty-sixth NMOS transistor Q26 also needs to be adjusted in real time. In addition, it is necessary to ensure that a PWM signal used to control the twenty-third NMOS transistor Q23, a PWM signal used to control the twenty-fourth NMOS transistor Q24, a PWM signal used to control the twenty-fifth NMOS transistor Q25, a PWM signal used to control the twenty-sixth NMOS transistor Q26, a PWM signal used to control a twenty-seventh NMOS transistor Q27, and a PWM signal used to control a twenty-eighth NMOS transistor Q28 are of a same cycle and same timing. Only in this way can it be ensured that the duty cycle of the PWM signal used to control the twenty-third NMOS transistor Q23 and the twenty-fifth NMOS transistor Q25 is adjusted, and at the same time, the duty cycle of the PWM signal used to control the twenty-fourth NMOS transistor Q24 and the twenty-sixth NMOS transistor Q26 is adjusted, so that power input from a primary coil of a transformer T3 is constant; and therefore, it is ensured that the DC-DC conversion circuit provided in FIG. 1 can output a direct current of a steady voltage.

Because a voltage range of the direct current signal input to the DC-DC conversion circuit is 36 volts to 72 volts, in order to achieve compatibility with the entire voltage range and meet an isolation requirement, it is extremely difficult to perform product selection and matching on electronic parts (including the PWM signals of the twenty-fourth NMOS transistor Q24, the twenty-sixth NMOS transistor Q26, and the twenty-third NMOS transistor Q23, the twenty-fourth NMOS transistor Q24, the twenty-fifth NMOS transistor Q25, the twenty-sixth NMOS transistor Q26, the twenty-seventh NMOS transistor Q27, the twenty-eighth NMOS transistor Q28, the transformer T3, and an inductor capacitor (LC) part), which results in a relatively high design cost; and in addition, electric signal conversion efficiency has to be sacrificed.

A worse disadvantage of the DC-DC conversion circuit shown in FIG. 1 is that in general circumstances, it is extremely difficult to ensure that a PWM signal used to control the twenty-third NMOS transistor Q23, a PWM signal used to control the twenty-fourth NMOS transistor Q24, a PWM signal used to control the twenty-fifth NMOS transistor Q25, a PWM signal used to control the twenty-sixth NMOS transistor Q26, a PWM signal used to control the twenty-seventh NMOS transistor Q27, and a PWM signal used to control the twenty-eighth NMOS transistor Q28 are time varying and of a same cycle and same timing, and therefore, it cannot be ensured that a voltage of a direct current output by the DC-DC conversion circuit is steady; and further, it cannot be ensured that a voltage of an electric signal provided by the voltage adjustment circuit for the load modules is constant.

SUMMARY

An objective of the present invention is to provide a power supply bus circuit to resolve a problem that, because for a DC-DC conversion circuit included in an existing power supply bus circuit, a PWM signal used to control an NMOS transistor in the DC-DC conversion circuit needs to be time varying, it is extremely difficult to ensure in real time that time varying PWM signals respectively used to control different NMOS transistors are of a same cycle and same timing, and therefore, it is difficult to ensure power input from a primary coil of a transformer is constant; then, it cannot be ensured that a voltage of a direct current output by the DC-DC conversion circuit is constant; and further, it cannot be ensured that a voltage of an electric signal provided by a voltage adjustment circuit for a load module is constant.

According to a first aspect, a power supply bus circuit includes a voltage regulator circuit and an impedance isolation circuit, and further includes one or more voltage adjustment circuits, where the voltage regulator circuit has a first positive electrode input end, a first negative electrode input end, a first positive electrode output end, and a first negative electrode output end; and the voltage regulator circuit receives a direct current signal through the first positive electrode input end and the first negative electrode input end, adjusts a voltage of the direct current signal to a first preset voltage, and outputs a direct current signal of the first preset voltage through the first positive electrode output end and the first negative electrode output end; the impedance isolation circuit has a second positive electrode input end, a second negative electrode input end, a second positive electrode output end, and a second negative electrode output end, where the second positive electrode input end is connected to the first positive electrode output end of the voltage regulator circuit, and the second negative electrode input end is connected to the first negative electrode output end of the voltage regulator circuit; and the impedance isolation circuit receives the direct current signal of the first preset voltage through the second positive electrode input end and the second negative electrode input end, adjusts the direct current signal of the first preset voltage to an alternating current signal, and outputs, by using a transformer, the alternating current signal in an isolated way and converts the alternating current signal that is output in an isolated way to an isolated direct current signal, and outputs the isolated direct current signal through the second positive electrode output end and the second negative electrode output end; and the voltage adjustment circuit has a third positive electrode input end, a third negative electrode input end, and a power supply end, where the third positive electrode input end is connected to the second positive electrode output end of the impedance isolation circuit, and the third negative electrode input end is connected to the second negative electrode output end of the impedance isolation circuit; and the voltage adjustment circuit receives the isolated direct current signal through the third positive electrode input end and the third negative electrode input end, chops the isolated direct current signal according to designated conduction time, converts a chopped electric signal to a power source signal of a constant direct current, and outputs the power source signal through the power supply end.

In a first possible implementation manner of the first aspect, the impedance isolation circuit further has a third controlled end, a fourth controlled end, a fifth controlled end, a sixth controlled end, a seventh controlled end, and an eighth controlled end; and the impedance isolation circuit includes a third NMOS transistor, a fourth NMOS transistor, a fifth NMOS transistor, a sixth NMOS transistor, a seventh NMOS transistor, an eighth NMOS transistor, and the transformer, where a drain of the third NMOS transistor is the second positive electrode input end of the impedance isolation circuit, a source of the sixth NMOS transistor is the second negative electrode input end of the impedance isolation circuit, a source of the eighth NMOS transistor is the second negative electrode output end of the impedance isolation circuit, a dotted end of a second secondary coil of the transformer is the second positive electrode output end of the impedance isolation circuit, a gate of the third NMOS transistor is the third controlled end of the impedance isolation circuit, a gate of the fourth NMOS transistor is the fourth controlled end of the impedance isolation circuit, a gate of the fifth NMOS transistor is the fifth controlled end of the impedance isolation circuit, a gate of the sixth NMOS transistor is the sixth controlled end of the impedance isolation circuit, a gate of the seventh NMOS transistor is the seventh controlled end of the impedance isolation circuit, a gate of the eighth NMOS transistor is the eighth controlled end of the impedance isolation circuit, a source of the third NMOS transistor is connected to a drain of the sixth NMOS transistor and an undotted end of a primary coil of the transformer separately, a drain of the fourth NMOS transistor is connected to the drain of the third NMOS transistor, a source of the fourth NMOS transistor is connected to a drain of the fifth NMOS transistor and a dotted end of the primary coil of the transformer separately, a source of the fifth NMOS transistor is connected to the source of the sixth NMOS transistor, a source of the seventh NMOS transistor is connected to the source of the eighth NMOS transistor, a drain of the eighth NMOS transistor is connected to an undotted end of the second secondary coil of the transformer, and a dotted end and an undotted end of a first secondary coil of the transformer are connected to a drain of the seventh NMOS transistor and the dotted end of the second secondary coil of the transformer respectively; and the impedance isolation circuit receives a third pulse width modulation PWM signal of a first preset duty cycle through the third controlled end and the fifth controlled end separately, receives, through the fourth controlled end and the sixth controlled end separately, a fourth PWM signal that differs from the third PWM signal by half a cycle, receives, through the seventh controlled end, a seventh PWM signal that is inverse to the fourth PWM signal in phase, and receives, through the eighth controlled end, an eighth PWM signal that is inverse to the third PWM signal in phase, so that the second positive electrode output end and the second negative electrode output end output an isolated PWM electric signal whose duty cycle is twice the first preset duty cycle.

With reference to the first aspect, in a second possible implementation manner of the first aspect, the impedance isolation circuit further has a ninth controlled end, a tenth controlled end, an eleventh controlled end, and a twelfth controlled end; and the impedance isolation circuit includes a ninth NMOS transistor, a tenth NMOS transistor, an eleventh NMOS transistor, a twelfth NMOS transistor, and the transformer, where a tap end of a primary coil of the transformer is the second positive electrode input end of the impedance isolation circuit, a source of the ninth NMOS transistor is the second negative electrode input end of the impedance isolation circuit, a source of the twelfth NMOS transistor is connected to the second negative electrode output end of the impedance isolation circuit, a dotted end of a second secondary coil of the transformer is connected to the second positive electrode output end of the impedance isolation circuit, a gate of the ninth NMOS transistor is the ninth controlled end of the impedance isolation circuit, a gate of the tenth NMOS transistor is the tenth controlled end of the impedance isolation circuit, a gate of the eleventh NMOS transistor is the eleventh controlled end of the impedance isolation circuit, a gate of the twelfth NMOS transistor is the twelfth controlled end of the impedance isolation circuit, a drain of the ninth NMOS transistor is connected to a dotted end of the primary coil of the transformer, a drain and a source of the tenth NMOS transistor are connected to an undotted end of the primary coil of the transformer and the source of the ninth NMOS transistor respectively, a source of the eleventh NMOS transistor is connected to the source of the twelfth NMOS transistor, a drain of the twelfth NMOS transistor is connected to an undotted end of the second secondary coil of the transformer, and a dotted end and an undotted end of a first secondary coil of the transformer are connected to a drain of the eleventh NMOS transistor and the dotted end of the second secondary coil of the transformer respectively; and the impedance isolation circuit receives a ninth PWM signal of a first preset duty cycle through the ninth controlled end, receives, through the tenth controlled end, a tenth PWM signal that differs from the ninth PWM signal by half a cycle, receives, through the eleventh controlled end, an eleventh PWM signal that is inverse to the tenth PWM signal in phase, and receives, through the twelfth controlled end, a twelfth PWM signal that is inverse to the ninth PWM signal in phase, so that the second positive electrode output end and the second negative electrode output end output an isolated PWM electric signal whose duty cycle is twice the first preset duty cycle.

With reference to the first aspect, the first possible implementation manner of the first aspect, or the second possible implementation manner of the first aspect, in a third possible implementation manner of the first aspect, the power supply bus circuit further includes a constant voltage circuit; and the constant voltage circuit is connected in series between the impedance isolation circuit and each of the voltage adjustment circuits, where the constant voltage circuit has a fourth positive electrode input end, a fourth negative electrode input end, a fourth positive electrode output end, and a fourth negative electrode output end, where the fourth positive electrode input end and the fourth negative electrode input end are connected to the second positive electrode output end and the second negative electrode output end of the impedance isolation circuit respectively, and the fourth positive electrode output end and the fourth negative electrode output end are connected to the third positive electrode input end and the third negative electrode input end of the voltage adjustment circuit respectively; and the constant voltage circuit receives, through the fourth positive electrode input end and the fourth negative electrode input end, the isolated direct current signal output by the impedance isolation circuit, adjusts a voltage of the isolated direct current signal to a constant second preset voltage, and outputs the isolated direct current signal of the second preset voltage through the fourth positive electrode output end and the fourth negative electrode output end.

With reference to the first aspect, the first possible implementation manner of the first aspect, the second possible implementation manner of the first aspect, or the third possible implementation manner of the first aspect, in a fourth possible implementation manner of the first aspect, the constant voltage circuit includes a first inductor and a first capacitor, where a first end and a second end of the first inductor are the fourth positive electrode input end and the fourth positive electrode output end of the constant voltage circuit respectively, a first end of the first capacitor is connected to the second end of the first inductor, a second end of the first capacitor is connected to the fourth negative electrode input end and the fourth negative electrode output end of the constant voltage circuit separately.

With reference to the first aspect, the first possible implementation manner of the first aspect, the second possible implementation manner of the first aspect, the third possible implementation manner of the first aspect, or the fourth possible implementation manner of the first aspect, in a fifth possible implementation manner of the first aspect, the voltage regulator circuit has a first controlled end and a second controlled end; and the voltage regulator circuit includes a first NMOS transistor, a second NMOS transistor, a third capacitor, and a second inductor, where a drain of the first NMOS transistor is the first positive electrode input end of the voltage regulator circuit, a source of the second NMOS transistor is the first negative electrode input end of the voltage regulator circuit, a first end of the third capacitor is the first positive electrode output end of the voltage regulator circuit, a second end of the third capacitor is the first negative electrode output end of the voltage regulator circuit, a gate of the first NMOS transistor is the first controlled end of the voltage regulator circuit, a gate of the second NMOS transistor is the second controlled end of the voltage regulator circuit, a source of the first NMOS transistor is connected to a first end of the second inductor, a drain of the second NMOS transistor is connected to the first end of the second inductor, the first end and the second end of the third capacitor are connected to a second end of the second inductor and the source of the second NMOS transistor respectively; and the voltage regulator circuit receives a first PWM signal through the first controlled end, and receives a second PWM signal through the second controlled end, so as to output the direct current signal of the first preset voltage through the first positive electrode output end and the first negative electrode output end.

With reference to the first aspect, the first possible implementation manner of the first aspect, the second possible implementation manner of the first aspect, the third possible implementation manner of the first aspect, or the fourth possible implementation manner of the first aspect, in a sixth possible implementation manner of the first aspect, the voltage regulator circuit has a thirteenth controlled end and a fourteenth controlled end; and the voltage regulator circuit includes a thirteenth NMOS transistor, a fourteenth NMOS transistor, a fourth capacitor, and a third inductor, where a first end of the third inductor is the first positive electrode input end of the voltage regulator circuit, a source of the thirteenth NMOS transistor is the first negative electrode input end of the voltage regulator circuit, a first end and a second end of the fourth capacitor are the first positive electrode output end and the first negative electrode output end of the voltage regulator circuit respectively, a gate of the thirteenth NMOS transistor is the thirteenth controlled end of the voltage regulator circuit, a gate of the fourteenth NMOS transistor is the fourteenth controlled end of the voltage regulator circuit, a source of the fourteenth NMOS transistor is connected to a second end of the third inductor and a drain of the thirteenth NMOS transistor separately, and the first end and second end of the fourth capacitor are connected to a drain of the fourth NMOS transistor and the source of the thirteenth NMOS transistor respectively; and the voltage regulator circuit receives a thirteenth PWM signal through the thirteenth controlled end, and receives a fourteenth PWM signal through the fourteenth controlled end, so as to output the direct current signal of the first preset voltage through the first positive electrode output end and the first negative electrode output end.

With reference to the first aspect, the first possible implementation manner of the first aspect, the second possible implementation manner of the first aspect, the third possible implementation manner of the first aspect, or the fourth possible implementation manner of the first aspect, in a seventh possible implementation manner of the first aspect, the voltage regulator circuit has a fifteenth controlled end and a sixteenth controlled end; and the voltage regulator circuit includes a fifteenth NMOS transistor, a sixteenth NMOS transistor, a fifth capacitor, and a fourth inductor, where a drain of the fifteenth NMOS transistor is the first positive electrode input end of the voltage regulator circuit, a second end of the fourth inductor is the first negative electrode input end of the voltage regulator circuit, a first end and a second end of the fifth capacitor are the first positive electrode output end and the first negative electrode output end of the voltage regulator circuit respectively, a gate of the fifteenth NMOS transistor is the fifteenth controlled end of the voltage regulator circuit, a gate of the sixteenth NMOS transistor is the sixteenth controlled end of the voltage regulator circuit, a first end of the fourth inductor is connected to a source of the fifteenth NMOS transistor and a drain of the sixteenth NMOS transistor separately, a source of the sixteenth NMOS transistor is connected to the first end of the fifth capacitor, and the second end of the fifth capacitor is connected to the second end of the fourth inductor; and the voltage regulator circuit receives a fifteenth PWM signal through the fifteenth controlled end, and receives a sixteenth PWM signal through the sixteenth controlled end, so as to output the direct current signal of the first preset voltage through the first positive electrode output end and the first negative electrode output end.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, or the seventh possible implementation manner of the first aspect, in an eighth possible implementation manner of the first aspect, the voltage adjustment circuit has a seventeenth controlled end and an eighteenth controlled end; and the voltage adjustment circuit includes a seventeenth NMOS transistor, an eighteenth NMOS transistor, a sixth capacitor, and a fifth inductor, where a drain of the seventeenth NMOS transistor is the third positive electrode input end of the voltage adjustment circuit, a source of the eighteenth NMOS transistor is the third negative electrode input end of the voltage adjustment circuit, a first end of the sixth capacitor is the power supply end of the voltage adjustment circuit, a gate of the seventeenth NMOS transistor is the seventeenth controlled end of the voltage adjustment circuit, a gate of the eighteenth NMOS transistor is the eighteenth controlled end of the voltage adjustment circuit, a source of the seventeenth NMOS transistor is connected to a first end of the fifth inductor and a drain of the eighteenth NMOS transistor, the first end and a second end of the sixth capacitor are connected to a second end of the fifth inductor and the source of the eighteenth NMOS transistor respectively, and the second end of the sixth capacitor is grounded; and the voltage adjustment circuit receives a seventeenth PWM signal of a second preset duty cycle through the seventeenth controlled end, and receives, through the eighteenth controlled end, an eighteenth PWM signal of a same cycle and same timing as the seventeenth PWM signal, so as to adjust the power source signal output through the power supply end.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, or the seventh possible implementation manner of the first aspect, in a ninth possible implementation manner of the first aspect, the voltage adjustment circuit has a nineteenth controlled end and a twentieth controlled end; and the voltage adjustment circuit includes a nineteenth NMOS transistor, a twentieth NMOS transistor, a seventh capacitor, and a sixth inductor, where a first end of the sixth inductor is the third positive electrode input end of the voltage adjustment circuit, a source of the nineteenth NMOS transistor is the third negative electrode input end of the voltage adjustment circuit, a first end of the seventh capacitor is the power supply end of the voltage adjustment circuit, a gate of the nineteenth NMOS transistor is the nineteenth controlled end of the voltage adjustment circuit, a gate of the twentieth NMOS transistor is the twentieth controlled end of the voltage adjustment circuit, a source of the twentieth NMOS transistor is connected to a second end of the sixth inductor and a drain of the nineteenth NMOS transistor separately, a drain of the twentieth NMOS transistor is connected to the first end of the seventh capacitor, and both the source of the nineteenth NMOS transistor and a second end of the seventh capacitor are grounded; and the voltage adjustment circuit receives a nineteenth PWM signal of a third preset duty cycle through the nineteenth controlled end, and receives, through the twentieth controlled end, a twentieth PWM signal of a same cycle and same timing as the nineteenth PWM signal, so as to adjust the power source signal output through the power supply end.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, or the seventh possible implementation manner of the first aspect, in a tenth possible implementation manner of the first aspect, the voltage adjustment circuit has a twenty-first controlled end and a twenty-second controlled end; and the voltage adjustment circuit includes a twenty-first NMOS transistor, a twenty-second NMOS transistor, an eighth capacitor, and a seventh inductor, where a drain of the twenty-first NMOS transistor is the third positive electrode input end of the voltage adjustment circuit, a second end of the seventh inductor is the third negative electrode input end of the voltage adjustment circuit, a first end of the eighth capacitor is the power supply end of the voltage adjustment circuit, a gate of the twenty-first NMOS transistor is the twenty-first controlled end of the voltage adjustment circuit, a gate of the twenty-second NMOS transistor is the twenty-second controlled end of the voltage adjustment circuit, a first end of the seventh inductor is connected to a source of the twenty-first NMOS transistor and a drain of the twenty-second NMOS transistor separately, a source of the twenty-second NMOS transistor is connected to the first end of the eighth capacitor, and both a second end of the eighth capacitor and the second end of the seventh inductor are grounded; and the voltage adjustment circuit receives a twenty-first PWM signal through the twenty-first controlled end, and receives, through the twenty-second controlled end, a twenty-second PWM signal of a same cycle and same timing as the twenty-first PWM signal, so as to adjust the power source signal output through the power supply end.

Benefits of the present invention are: firstly, a voltage regulator circuit performs voltage regulation and adjustment, and outputs a direct current signal of a first preset voltage to an impedance isolation circuit; secondly, the impedance isolation circuit performs power adjustment, and because a signal used when the impedance isolation circuit performs the power adjustment is a direct current signal of a constant voltage (a first preset voltage), it is unnecessary to ensure that a control signal required by the impedance isolation circuit and a control signal required by the voltage regulator circuit are of a same cycle or same timing, and therefore, it can further be ensured that power input from a primary coil of a transformer is constant; finally, it can be ensured that an electric signal provided by a voltage adjustment circuit for a load module is constant.

BRIEF DESCRIPTION OF DRAWINGS

To describe the technical solutions in the embodiments of the present invention more clearly, the following briefly introduces the accompanying drawings required for describing the embodiments or the prior art. The accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer and more comprehensible, the following further describes the present invention in detail with reference to the accompanying drawings and embodiments. It should be understood that the specific embodiments described herein are merely used to explain the present invention but are not intended to limit the present invention. To describe the technical solutions of the present invention, the following description uses specific embodiments.

Figure 1:
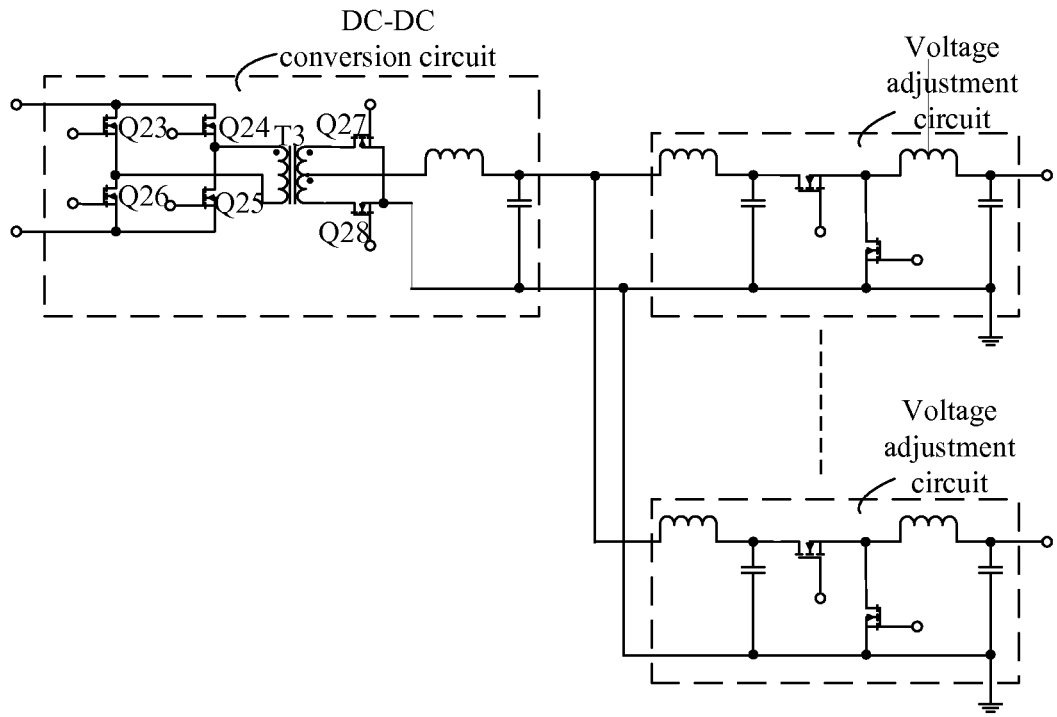
FIG. 1 is a circuit diagram of a power supply bus circuit in the prior art.
Figure 2:
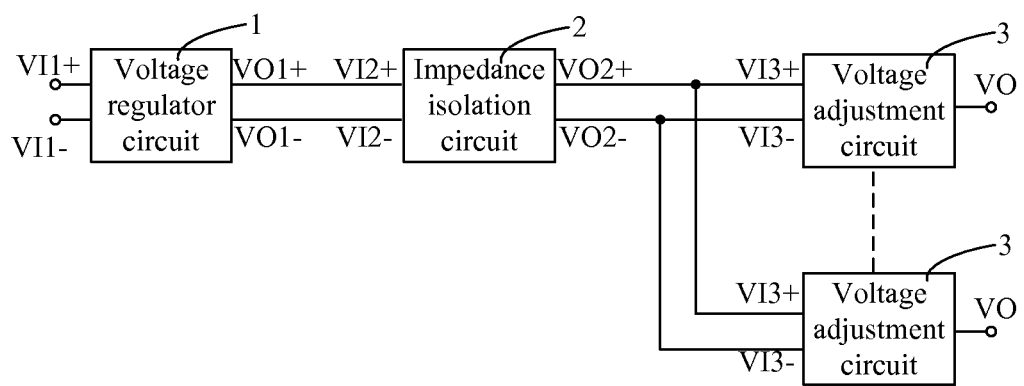
FIG. 2 is a diagram of a first circuit structure of a power supply bus circuit according to an embodiment of the present invention.

FIG. 2 shows a first compositional structure of a power supply bus circuit according to an embodiment of the present invention, and for convenience of description, only a part related to the embodiment of the present invention is shown. Detailed descriptions are as follows.

As shown in FIG. 2, the power supply bus circuit provided in the embodiment of the present invention includes a voltage regulator circuit 1 and an impedance isolation circuit 2, and further includes one or more voltage adjustment circuits 3. The voltage adjustment circuit 3 may be disposed in a place close to an electronic device, to supply power to the electronic device. The voltage adjustment circuit 3 may be disposed in an electronic device to supply power to an entire circuit in the electronic device or a part of the circuit; and in addition, voltage adjustment circuits 3 may be disposed in different electronic devices, and it is required that, when voltage adjustment circuits 3 are designed, electronic components with different parameters are selected for different electronic devices, to meet voltage requirements of the different electronic devices. As a specific implementation manner, the voltage regulator circuit 1 and the impedance isolation circuit 2 may be relatively far from the voltage adjustment circuit 3 (for example, both the voltage regulator circuit 1 and the impedance isolation circuit 2 are disposed outside an electronic device and in places relatively far from the electronic device), and therefore, a direct current signal output from the impedance isolation circuit 2 can be used by different voltage adjustment circuits 3 (one or more voltage adjustment circuits disposed in different electronic devices). As a specific implementation manner, there are multiple circuit modules in an electronic device, where each of the circuit modules supplies power by using a different voltage adjustment circuit 3, and in addition, the voltage regulator circuit 1 and/or the impedance isolation circuit 2 may also be disposed in the electronic device, and the impedance isolation circuit 2 is used to output a same direct current signal to each voltage adjustment circuit 3.

The voltage regulator circuit 1 has a first positive electrode input end VI1+, a first negative electrode input end VI1−, a first positive electrode output end VO1+, and a first negative electrode output end VO1−; and the voltage regulator circuit 1 receives a direct current signal through the first positive electrode input end VI1+ and the first negative electrode input end VI1−, adjusts a voltage of the direct current signal to a first preset voltage, and outputs a direct current signal of the first preset voltage through the first positive electrode output end VO1+ and the first negative electrode output end VO1−. After mains is filtered by an electromagnetic interference (EMI) power source filter and converted from an alternating current to a direct current, a direct current signal (for example, a direct current signal ranging from 36 volts to 72 volts) is generated; the voltage regulator circuit 1 receives, through the first positive electrode input end VI1+, the direct current signal with a high electric potential, and receives, through the first negative electrode input end VI1−, the direct current signal with a low electric potential. The voltage regulator circuit 1 converts the direct current signal to an alternating current signal of first fixed power, then converts the alternating current signal of the first fixed power to a direct current signal that is of a direct current and has the first preset voltage, outputs, through the first positive electrode output end VO1+, the direct current signal that is of the first preset voltage and with a high electric potential, and outputs, through the first negative electrode output end VO1−, the direct current signal that is of the first preset voltage and with a low electric potential.

The impedance isolation circuit 2 has a second positive electrode input end VI2+, a second negative electrode input end VI2−, a second positive electrode output end VO2+, and a second negative electrode output end VO2−, where the second positive electrode input end VI2+ is connected to the first positive electrode output end VO1+ of the voltage regulator circuit 1, and the second negative electrode input end VI2− is connected to the first negative electrode output end VO1− of the voltage regulator circuit 1, and the impedance isolation circuit 2 receives the direct current signal of the first preset voltage through the second positive electrode input end VI2+ and the second negative electrode input end VI2−, adjusts the direct current signal of the first preset voltage to an alternating current signal, outputs the alternating current signal in an isolated way by using a transformer, and outputs an isolated direct current signal through the second positive electrode output end VO2+ and the second negative electrode output end VO2−. The impedance isolation circuit 2 receives the direct current signal that is of the first preset voltage and output by the voltage regulator circuit 1, and the direct current signal that is of the first preset voltage and with a high electric potential is received through the second positive electrode input end VI2+, and the direct current signal that is of the first preset voltage and with a low electric potential is received through the second negative electrode input end VI2−. The impedance isolation circuit 2 adjusts the direct current signal of the first preset voltage to an alternating current signal of second fixed power; then, the alternating current signal of the second fixed power is input to the transformer through a primary coil, and the transformer performs voltage conversion and isolation (including impedance isolation) on the input alternating current signal; the impedance isolation circuit 2 converts an alternating current signal that is output in an isolated way through a secondary coil of the transformer, to an isolated direct current signal, outputs the isolated direct current signal with a high electric potential through the second positive electrode output end VO2+, and outputs the isolated direct current signal (generally, an earth signal) with a low electric potential through the second negative electrode output end VO2−. It should be noted that, because an electric signal output by the voltage regulator circuit 1 to the impedance isolation circuit 2 is the direct current signal of the first preset voltage, it is unnecessary to ensure that a control signal (for example, a PWM signal) required by the voltage regulator circuit 1 to convert a direct current to an alternating current and a control signal (for example, a PWM signal) required by the impedance isolation circuit 2 to convert a direct current to an alternating current are of a same cycle or same timing; in this way, for the control signal required by the voltage regulator circuit 1 to convert a direct current to an alternating current and the control signal required by the impedance isolation circuit 2 to convert a direct current to an alternating current, control signals of different cycles and/or different timing may be used respectively. It should be noted that, because the voltage regulator circuit 1 adjusts a direct current signal that is in a different voltage range (for example, a direct current signal ranging from 36 volts to 72 volts) to the direct current signal of the first preset voltage, a voltage of a direct current signal adjusted and output by the voltage regulator circuit 1 may be slightly higher or lower than the first preset voltage, and therefore, when the impedance isolation circuit 2 adjusts the direct current signal of the first preset voltage to an alternating current signal, a control signal (for example, a PWM signal) is further used to adjust the direct current signal of the first preset voltage to a constant alternating current signal of the second fixed power.

The voltage adjustment circuit 3 has a third positive electrode input end VI3+, a third negative electrode input end VI3−, and a power supply end VO, where the third positive electrode input end VI3+ is connected to the second positive electrode output end VO2+ of the impedance isolation circuit 2, and the third negative electrode input end VI3− is connected to the second negative electrode output end VO2− of the impedance isolation circuit 2; and the voltage adjustment circuit 3 receives the isolated direct current signal through the third positive electrode input end VI3+ and the third negative electrode input end VI3−, chops the isolated direct current signal according to designated conduction time, converts a chopped electric signal to a power source signal of a constant direct current, and outputs the power source signal through the power supply end VO. The voltage adjustment circuit 3 receives the isolated current signal with a high electric potential through the third positive electrode input end VI3+, and receives the isolated direct current signal (generally, an earth signal) with a low electric potential through the third negative electrode input end VI3−. Then, conduction time is determined according to a voltage required by a load module, and the isolated direct current signal is chopped by using a control signal indicating the conduction time, to generate a variable direct current signal; and the variable direct current signal is further adjusted to a constant direct current signal (that is, a power source signal of a constant direct current), where the adjusted power source signal is of the voltage required by the load module. In this way, the conduction time may be adjusted according to voltages required by different load modules, to ensure that the voltage adjustment circuit 3 can output a power source signal having the voltage required by the load module. In a specific implementation manner of the present invention, if the isolated direct current signal received by the voltage adjustment circuit 3 through the third positive electrode input end VI3+ and the third negative electrode input end VI3− is a constant direct current signal, it is unnecessary to ensure that a control signal that is used by the voltage adjustment circuit 3 for chopping and has the foregoing conduction time and a control signal required by the impedance isolation circuit 2 to convert a direct current to an alternating current are of a same cycle or same timing. In a specific implementation manner of the present invention, if the isolated direct current signal received by the voltage adjustment circuit 3 through the third positive electrode input end VI3+ and the third negative electrode input end VI3− is a direct current signal (for example, a PWM signal) that is voltage-varying and direction-constant, it is necessary to ensure that a control signal that is used by the voltage adjustment circuit 3 for chopping and has the foregoing conduction time and a control signal required by the impedance isolation circuit 2 to convert a direct current to an alternating current are of a same cycle and same timing. Only in this way can it be ensured that chopping is performed in the conduction time on the isolated direct current with a high electric potential, thereby further ensuring that a voltage adjustment circuit 3 supplying power to a load module outputs a power source signal of a voltage required by the load module.

Figure 3:
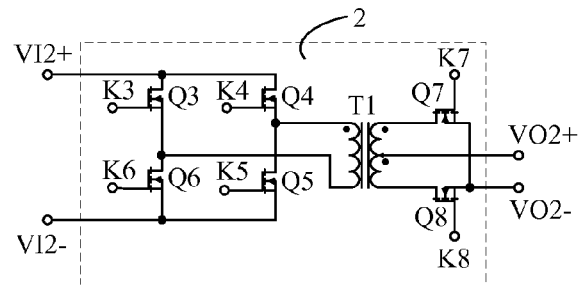
FIG. 3 is a diagram of a first compositional structure of an impedance isolation circuit 2 according to an embodiment of the present invention.

FIG. 3 shows a first compositional structure of the impedance isolation circuit 2 according to an embodiment of the present invention, and for convenience of description, only a part related to the embodiment of the present invention is shown. Detailed descriptions are as follows.

In an embodiment of the present invention, as shown in FIG. 3, the impedance isolation circuit 2 further has a third controlled end K3, a fourth controlled end K4, a fifth controlled end K5, a sixth controlled end K6, a seventh controlled end K7, and an eighth controlled end K8; and the impedance isolation circuit 2 includes a third NMOS transistor Q3, a fourth NMOS transistor Q4, a fifth NMOS transistor Q5, a sixth NMOS transistor Q6, a seventh NMOS transistor Q7, an eighth NMOS transistor Q8, and a transformer T1.

A drain of the third NMOS transistor Q3 is the second positive electrode input end VI2+ of the impedance isolation circuit 2, a source of the sixth NMOS transistor Q6 is the second negative electrode input end VI2− of the impedance isolation circuit 2, a source of the eighth NMOS transistor Q8 is the second negative electrode output end VO2− of the impedance isolation circuit 2, a dotted end of a second secondary coil of the transformer T1 is the second positive electrode output end VO2+ of the impedance isolation circuit 2, a gate of the third NMOS transistor Q3 is the third controlled end K3 of the impedance isolation circuit 2, a gate of the fourth NMOS transistor Q4 is the fourth controlled end K4 of the impedance isolation circuit 2, a gate of the fifth NMOS transistor Q5 is the fifth controlled end K5 of the impedance isolation circuit 2, a gate of the sixth NMOS transistor Q6 is the sixth controlled end K6 of the impedance isolation circuit 2, a gate of the seventh NMOS transistor Q7 is the seventh controlled end K7 of the impedance isolation circuit 2, a gate of the eighth NMOS transistor Q8 is the eighth controlled end K8 of the impedance isolation circuit 2, a source of the third NMOS transistor Q3 is connected to a drain of the sixth NMOS transistor Q6 and an undotted end of a primary coil of the transformer T1 separately, a drain of the fourth NMOS transistor Q4 is connected to the drain of the third NMOS transistor Q3, a source of the fourth NMOS transistor Q4 is connected to a drain of the fifth NMOS transistor Q5 and a dotted end of the primary coil of the transformer T1 separately, a source of the fifth NMOS transistor Q5 is connected to the source of the sixth NMOS transistor Q6, a source of the seventh NMOS transistor Q7 is connected to the source of the eighth NMOS transistor Q8, a drain of the eighth NMOS transistor Q8 is connected to an undotted end of the second secondary coil of the transformer T1, and a dotted end and an undotted end of a first secondary coil of the transformer T1 are connected to a drain of the seventh NMOS transistor Q7 and the dotted end of the second secondary coil of the transformer T1 respectively.

The impedance isolation circuit 2 receives a third PWM signal of a first preset duty cycle through the third controlled end K3 and the fifth controlled end K5 separately, receives, through the fourth controlled end K4 and the sixth controlled end K6 separately, a fourth PWM signal that differs from the third PWM signal by half a cycle, receives, through the seventh controlled end K7, a seventh PWM signal that is inverse to the fourth PWM signal in phase, and receives, through the eighth controlled end K8, an eighth PWM signal that is inverse to the third PWM signal in phase, so that the second positive electrode output end VO2+ and the second negative electrode output end VO2− output an isolated PWM electric signal whose duty cycle is twice the first preset duty cycle.

It should be noted that, because the direct current signal output by the voltage regulator circuit 1 is the direct current signal of the first preset voltage, the third PWM signal required by the impedance isolation circuit 2 may further be determined (the first preset duty cycle of the third PWM signal is determined). In a specific implementation manner of the present invention, a control module is used to provide control signals (including the third PWM signal and the fourth PWM signal) to the power supply bus circuit; and further, even if a voltage of the direct current signal output by the voltage regulator circuit 1 is slightly higher or lower than the first preset voltage, the control module may still detect a voltage of a direct current signal received by the impedance isolation circuit 2 through the second positive electrode input end VI2+ and the second negative electrode input end VI2−, determine a voltage difference between the detected voltage and the first preset voltage, and adjust, according to the voltage difference, the third PWM signal (the first preset duty cycle of the third PWM signal is redetermined) and the fourth PWM signal that are required by the impedance isolation circuit 2. In this way, it is ensured that power of an alternating current signal input through the primary coil of the transformer T1 is fixed.

In this embodiment, according to a wave-form relationship among the third PWM signal, the fourth PWM signal, the seventh PWM signal, and the eighth PWM signal, the following may be known.

(1) When the third NMOS transistor Q3 and the fifth NMOS transistor Q5 are conductive, the seventh NMOS transistor Q7 is conductive, and the fourth NMOS transistor Q4, the sixth NMOS transistor Q6, and the eighth NMOS transistor Q8 are cut off; and in this way, the impedance isolation circuit 2 outputs an electric signal in an isolated way by using the first secondary coil and the seventh NMOS transistor Q7, and an electric signal with a high electric potential is output through the second positive electrode output end VO2+, and an electric signal (generally, an earth signal) with at a low electric potential is output through the second negative electrode output end VO2−.

(2) When the fourth NMOS transistor Q4 and the sixth NMOS transistor Q6 are conductive, the eighth NMOS transistor Q8 is conductive, and the third NMOS transistor Q3, the fifth NMOS transistor Q5, and the seventh NMOS transistor Q7 are cut off; and in this way, the impedance isolation circuit 2 outputs an electric signal in an isolated way by using the second secondary coil and the eighth NMOS transistor Q8, and an electric signal with a high electric potential is output through the second positive electrode output end VO2+, and an electric signal (generally, an earth signal) with a low electric potential is output through the second negative electrode output end VO2−.

By combining (1) and (2), it may be seen that, because the impedance isolation circuit 2 constantly outputs an electric signal with a high electric potential through the second positive electrode output end VO2+, and outputs an electric signal with a low electric potential through the second negative electrode output end VO2−, an electric signal output by the impedance isolation circuit 2 constantly through the second positive electrode output end VO2+ is a direct current signal with a high electric potential, and an electric signal output through the second negative electrode output end VO2− is a direct current signal (generally, an earth signal) with a low electric potential. In addition, a duty cycle of the direct current signal, output through the second positive output end VO2+, with a high electric potential is twice the first preset duty cycle.

Preferably, to ensure that the direct current signal of the first preset voltage can be efficiently converted to the isolated direct current signal, the first preset duty cycle of the third PWM signal received by the impedance isolation circuit 2 is close to 50% (for example, 48%); because the duty cycle of the direct current signal, output by the impedance isolation circuit 2 through the second positive electrode output end VO2+, with a high electric potential is twice the first preset duty cycle (a duty cycle close to 100%), the direct current signal output by the voltage regulator circuit 1 is efficiently coupled for output by using the transformer T1, and isolated output is implemented by using the transformer 1.

Figure 4:
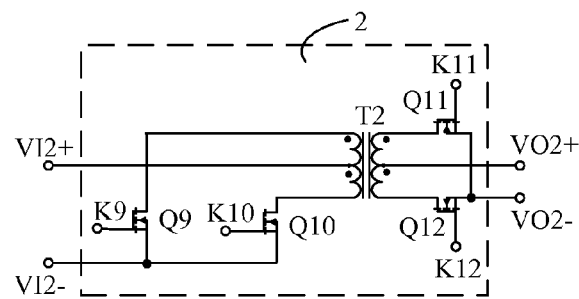
FIG. 4 is a diagram of a second compositional structure of an impedance isolation circuit 2 according to an embodiment of the present invention.

FIG. 4 shows a second compositional structure of the impedance isolation circuit 2 according to an embodiment of the present invention, and for convenience of description, only a part related to the embodiment of the present invention is shown. Detailed descriptions are as follows.

In an embodiment of the present invention, an impedance isolation circuit 2 implemented by using a push-pull transformer T2 is provided, and as shown in FIG. 4, the impedance isolation circuit 2 has a ninth controlled end K9, a tenth controlled end K10, an eleventh controlled end K11, and a twelfth controlled end K12; and the impedance isolation circuit 2 includes a ninth NMOS transistor Q9, a tenth NMOS transistor Q10, an eleventh NMOS transistor Q11, a twelfth NMOS transistor Q12, and the transformer T2.

A tap end of a primary coil of the transformer T2 is a second positive electrode input end VI2+ of the impedance isolation circuit 2, a source of the ninth NMOS transistor Q9 is a second negative electrode input end VI2− of the impedance isolation circuit 2, a source of the twelfth NMOS transistor Q12 is connected to a second negative electrode output end VO2− of the impedance isolation circuit 2, a dotted end of a second secondary coil of the transformer T2 is connected to a second positive electrode output end VO2+ of the impedance isolation circuit 2, a gate of the ninth NMOS transistor Q9 is the ninth controlled end K9 of the impedance isolation circuit 2, a gate of the tenth NMOS transistor Q10 is the tenth controlled end K10 of the impedance isolation circuit 2, a gate of the eleventh NMOS transistor Q11 is the eleventh controlled end K11 of the impedance isolation circuit 2, a gate of the twelfth NMOS transistor Q12 is the twelfth controlled end K12 of the impedance isolation circuit 2, a drain of the ninth NMOS transistor Q9 is connected to a dotted end of the primary coil of the transformer T2, a drain and a source of the tenth NMOS transistor Q10 are connected to an undotted end of the primary coil of the transformer T2 and the source of the ninth NMOS transistor Q9 respectively, a source of the eleventh NMOS transistor Q11 is connected to the source of the twelfth NMOS transistor Q12, a drain of the twelfth NMOS transistor Q12 is connected to an undotted end of the second secondary coil of the transformer T2, and a dotted end and an undotted end of a first secondary coil of the transformer T2 are connected to a drain of the eleventh NMOS transistor Q11 and the dotted end of the second secondary coil of the transformer T2 respectively.

The impedance isolation circuit 2 receives a ninth PWM signal of a first preset duty cycle through the ninth controlled end K9, receives, through the tenth controlled end K10, a tenth PWM signal that differs from the ninth PWM signal by half a cycle, receives, through the eleventh controlled end K11, an eleventh PWM signal that is inverse to the tenth PWM signal in phase, and receives, through the twelfth controlled end K12, a twelfth PWM signal that is inverse to the ninth PWM signal in phase, so that the second positive electrode output end VO2+ and the second negative electrode output end VO2− output an isolated PWM electric signal whose duty cycle is twice the first preset duty cycle.

Similarly, because the direct current signal output by the voltage regulator circuit 1 is the direct current signal of the first preset voltage, the ninth PWM signal required by the impedance isolation circuit 2 may further be determined (the first preset duty cycle of the ninth PWM signal is determined). In a specific implementation manner of the present invention, a control module is used to provide control signals (including the ninth PWM signal and the tenth PWM signal) to the power supply bus circuit; and further, even if a voltage of the direct current signal output by the voltage regulator circuit 1 is slightly higher or lower than the first preset voltage, the control module may still detect a voltage of a direct current signal received by the impedance isolation circuit 2 through the second positive electrode input end VI2+ and the second negative electrode input end VI2−, determine a voltage difference between the detected voltage and the first preset voltage, and adjust, according to the voltage difference, the ninth PWM signal (the first preset duty cycle of the ninth PWM signal is redetermined) and the tenth PWM signal that are required by the impedance isolation circuit 2. In this way, it is ensured that power of an alternating current signal input through the primary coil of the transformer T2 is fixed.

In this embodiment, according to a wave-form relationship among the ninth PWM signal, the tenth PWM signal, the eleventh PWM signal, and the twelfth PWM signal, the following may be known.

(3) When the ninth NMOS transistor Q9 is conductive, the eleventh NMOS transistor Q11 is conductive, and the tenth NMOS transistor Q10 and the twelfth NMOS transistor Q12 are cut off; and in this way, the impedance isolation circuit 2 outputs an electric signal in an isolated way by using the first secondary coil and the eleventh NMOS transistor Q11, and then outputs an electric signal with a high electric potential through the second positive electrode output end VO2+, and outputs an electric signal (generally, an earth signal) with a low electric potential through the second negative electrode output end VO2−.

(4) When the tenth NMOS transistor Q10 is conductive, the twelfth NMOS transistor Q12 is conductive, and the ninth NMOS transistor Q9 and the eleventh NMOS transistor Q11 are cut off; and in this way, the impedance isolation circuit 2 outputs an electric signal in an isolated way by using the second secondary coil and the twelfth NMOS transistor Q12, and then outputs an electric signal with a high electric potential through the second positive electrode output end VO2+, and outputs an electric signal (generally, an earth signal) with a low electric potential through the second negative electrode output end VO2−.

By combining (3) and (4), it may be seen that, because the impedance isolation circuit 2 constantly outputs an electric signal with a high electric potential through the second positive electrode output end VO2+, and outputs an electric signal with a low electric potential through the second negative electrode output end VO2−, an electric signal output by the impedance isolation circuit 2 constantly through the second positive electrode output end VO2+ is a direct current signal with a high electric potential, and an electric signal output through the second negative electrode output end VO2− is a direct current signal (generally, an earth signal) with a low electric potential. In addition, a duty cycle of the direct current signal, output through the second positive electrode output end VO2+, with a high electric potential is twice the first preset duty cycle.

Preferably, to ensure that the direct current signal of the first preset voltage can be efficiently converted to the isolated direct current signal, the first preset duty cycle of the ninth PWM signal received by the impedance isolation circuit 2 is close to 50% (for example, 48%); because the duty cycle of the direct current signal, output by the impedance isolation circuit 2 through the second positive electrode output end VO2+, with a high electric potential is twice the first preset duty cycle (a duty cycle close to 100%), the direct current signal output by the voltage regulator circuit 1 is efficiently coupled for output by using the transformer T2, and isolated output is implemented by using the transformer 2.

In an embodiment of the present invention, the power supply bus circuit further includes a constant voltage circuit 4; and the constant voltage circuit 4 is connected in series between the impedance isolation circuit 2 and each of the voltage adjustment circuits 3. Manners for connecting the constant voltage circuit 4 in series between the impedance isolation circuit 2 and the voltage adjustment circuit 3 include at least the following two types.

Figure 5:
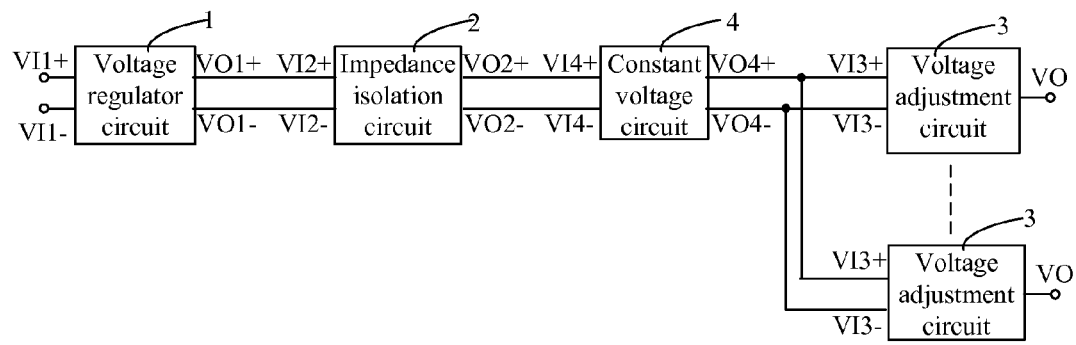
FIG. 5 is a diagram of a second circuit structure of a power supply bus circuit according to an embodiment of the present invention.

1. According to a second compositional structure of the power supply bus circuit shown in FIG. 5, the second positive electrode output end VO2+ and the second negative electrode output end VO2− of the impedance isolation circuit 2 are connected to a fourth positive electrode input end VI4+ and a fourth negative electrode input end VI4− of one constant voltage circuit 4 respectively, and after the isolated direct current signal output by the impedance isolation circuit 2 is adjusted to a direct current signal of a constant voltage by using the constant voltage circuit 4, the direct current signal of the constant voltage is output to each of the voltage adjustment circuits 3; in this way, it is unnecessary that a control signal that is used by the voltage adjustment circuit 3 for chopping and has the foregoing conduction time and a control signal required by the impedance isolation circuit 2 to convert a direct current to an alternating current are of a same cycle or same timing, and by adjusting, according to a voltage requirement of a load module, the conduction time of the control signal used for chopping, the voltage adjustment circuit 3 can output a direct current signal of a voltage required by the load module.

Figure 6:
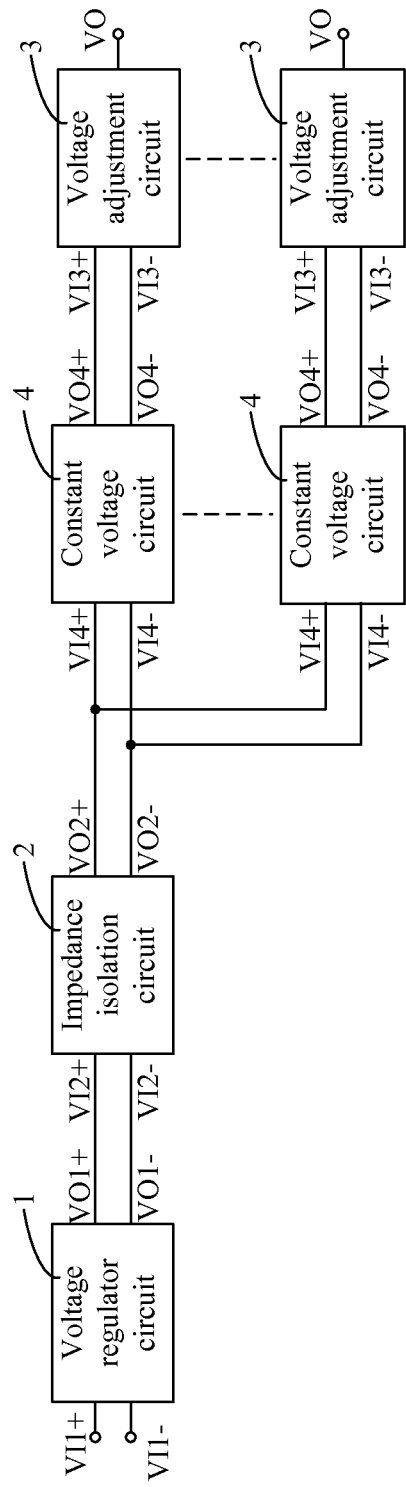
FIG. 6 is a diagram of a third circuit structure of a power supply bus circuit according to an embodiment of the present invention.

2. According to a third compositional structure of the power supply bus circuit shown in FIG. 6, the number of constant voltage circuits 4 included in the power supply bus circuit equals at least the number of voltage adjustment circuits 3, and each of the voltage adjustment circuits 3 is separately connected, by using the third positive electrode input end VI3+ and the third negative electrode input end VI3−, to a fourth positive electrode output end VO4+ and a fourth negative electrode output end VO4− of one constant voltage circuit 4; in this way, it is unnecessary that a control signal that is used by the voltage adjustment circuit 3 for chopping and has the foregoing conduction time and a control signal required by the impedance isolation circuit 2 to convert a direct current to an alternating current are of a same cycle or same timing, and by directly adjusting, according to a voltage requirement of a load module, the conduction time of the control signal used for chopping, the voltage adjustment circuit 3 can output a direct current signal of a voltage required by the load module, and further, a beat noise generated between multiple voltage adjustment circuits 3 that use control signals of different cycles may be avoided.

The constant voltage circuit 4 has a fourth positive electrode input end VI4+, a fourth negative electrode input end VI4−, a fourth positive electrode output end VO4+, and a fourth negative electrode output end VO4−, where the fourth positive electrode input end VI4+ and the fourth negative electrode input end VI4− are connected to the second positive electrode output end VO2+ and the second negative electrode output end VO2− of the impedance isolation circuit 2 respectively, and the fourth positive electrode output end VO4+ and the fourth negative electrode output end VO4− are connected to the third positive electrode input end VI3+ and the third negative electrode input end VI3− of the voltage adjustment circuit 3 respectively; and then, the constant voltage circuit 4 receives, through the fourth positive electrode input end VI4+ and the fourth negative electrode input end VI4−, the isolated direct current signal output by the impedance isolation circuit 2, adjusts a voltage of the isolated direct current signal to a second preset voltage that is constant, and outputs the isolated direct current signal of the second preset voltage through the fourth positive electrode output end VO4+ and the fourth negative electrode output end VO4−.

If the isolated direct current signal received by the constant voltage circuit 4 through the fourth positive electrode input end VI4+ and the fourth negative electrode input end VI4− is a direct current signal of a variable voltage, the isolated direct current signal is adjusted to a constant-voltage direct current signal of the second preset voltage. Certainly, if the isolated direct current signal received by the constant voltage circuit 4 through the fourth positive electrode input end VI4+ and the fourth negative electrode input end VI4− is a direct current signal of a constant voltage, only the isolated direct current signal is adjusted to a direct current signal of the second preset voltage.

In this way, an electric signal received by each of the voltage adjustment circuits 3 through the third positive electrode input end VI3+ and the third negative electrode input end VI3− is a constant-voltage direct current signal of the second preset voltage; and it is unnecessary that a control signal that is used by the voltage adjustment circuit 3 for chopping and has the foregoing conduction time and a control signal required by the impedance isolation circuit 2 to convert a direct current to an alternating current are of a same cycle or same timing, and by adjusting, only according to a voltage requirement of a load module, the conduction time of the control signal used for chopping, the voltage adjustment circuit 3 can output a direct current signal of a voltage required by the load module.

Figure 7:
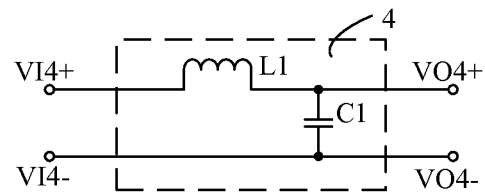
FIG. 7 is a circuit diagram of a constant voltage circuit 4 according to an embodiment of the present invention.

FIG. 7 shows a specific implementation circuit of the constant voltage circuit 4 according to an embodiment of the present invention, and for convenience of description, only a part related to the embodiment of the present invention is shown. Detailed descriptions are as follows.

In an exemplary embodiment of the present invention, as shown in FIG. 7, the constant voltage circuit 4 includes a first inductor L1 and a first capacitor C1, where a first end and a second end of the first inductor L1 are the fourth positive electrode input end VI4+ and the fourth positive electrode output end VO4+ of the constant voltage circuit 4 respectively, a first end of the first capacitor C1 is connected to the second end of the first inductor L1, a second end of the first capacitor C1 is connected to the fourth negative electrode input end VI4− and the fourth negative electrode output end VO4− of the constant voltage circuit 4 separately.

If the isolated direct current signal received by the constant voltage circuit 4 through the fourth positive electrode input end VI4+ and the fourth negative electrode input end VI4− is a direct current signal of a variable voltage, the constant voltage circuit 4 performs low-pass filtering on the direct current signal by using the first inductor L1 and the first capacitor C1, to regulate the voltage, and outputs the constant-voltage direct current signal of the second preset voltage to the voltage adjustment circuit 3 through the fourth positive electrode output end VO4+ and the fourth negative electrode output end VO4−. If an electric signal received through the fourth positive electrode input end VI4+ and the fourth negative electrode input end VI4− is a direct current signal of a constant voltage, the isolated direct current signal is adjusted to a direct current signal of the second preset voltage by only using the first inductor L1, and the constant-voltage direct current signal of the second preset voltage is output to the voltage adjustment circuit 3 through the fourth positive electrode output end VO4+ and the fourth negative electrode output end VO4−.

Figure 8:
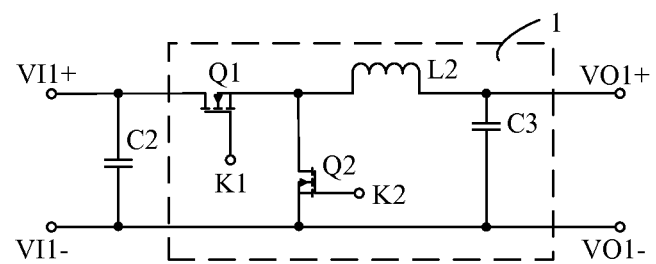
FIG. 8 is a first circuit diagram of a voltage regulator circuit 1 according to an embodiment of the present invention.

FIG. 8 shows a first specific implementation circuit of the voltage regulator circuit 1 according to an embodiment of the present invention, and for convenience of description, only a part related to the embodiment of the present invention is shown. Detailed descriptions are as follows.

In an embodiment of the present invention, as shown in FIG. 8, the voltage regulator circuit 1 has a first controlled end K1 and a second controlled end K2; and the voltage regulator circuit 1 includes a first NMOS transistor Q1, a second NMOS transistor Q2, a third capacitor C3, and a second inductor L2.

A drain of the first NMOS transistor Q1 is the first positive electrode input end VI1+ of the voltage regulator circuit 1, a source of the second NMOS transistor Q2 is the first negative electrode input end VI1− of the voltage regulator circuit 1, a first end of the third capacitor C3 is the first positive electrode output end VO1+ of the voltage regulator circuit 1, a second end of the third capacitor C3 is the first negative electrode output end VO1− of the voltage regulator circuit 1, a gate of the first NMOS transistor Q1 is the first controlled end K1 of the voltage regulator circuit 1, a gate of the second NMOS transistor Q2 is the second controlled end K2 of the voltage regulator circuit 1, a source of the first NMOS transistor Q1 is connected to a first end of the second inductor L2, a drain of the second NMOS transistor Q2 is connected to the first end of the second inductor L2, the first end and the second end of the third capacitor C3 are connected to a second end of the second inductor L2 and the source of the second NMOS transistor Q2 respectively; and the voltage regulator circuit 1 receives a first PWM signal through the first controlled end K1, and receives a second PWM signal through the second controlled end K2, so as to output the direct current signal of the first preset voltage through the first positive electrode output end VO1+ and the first negative electrode output end VO1−.

In this embodiment, after mains is filtered by an EMI power source filter and converted from an alternating current to a direct current, a direct current signal (for example, a direct current signal ranging from 36 volts to 72 volts) is generated, and a voltage range of the generated direct current signal is relatively wide, and therefore, the first PWM signal and/or the second PWM signal needs to be adjusted for different voltages in the voltage range; because conduction time of the first NMOS transistor Q1 is controlled by the first PWM signal, and conduction time of the second NMOS transistor Q2 is controlled by the second PWM signal, the first PWM signal and the second PWM signal may be used collaboratively to control power of an alternating current signal input to a low-pass filtering circuit formed by the third capacitor C3 and the second inductor L2 to be first fixed power, so that it is ensured that the direct current signal output by the low-pass filter (formed by the third capacitor C3 and the second inductor L2) has the first preset voltage, and that the direct current signal of the first preset voltage is output through the first positive electrode output end VO1+ and the first negative electrode output VO1−.

Preferably, the voltage regulator circuit 1 further includes a second capacitor C2, where a first end and a second end of the second capacitor C2 are connected to the drain of the first NMOS transistor Q1 and the source of the second NMOS transistor Q2 respectively. In this way, the voltage regulator circuit 1 may perform, by using the second capacitor C2, low-pass filtering on a direct current signal received through the first positive electrode input end VI1+ and the first negative electrode input end VI1−, to filter out high-frequency noise signals other than the direct current signal, so as to prevent the high-frequency noise signals from doing harm to electronic parts of the voltage regulator circuit 1, the impedance isolation circuit 2, and the voltage adjustment circuit 3.

Figure 9:
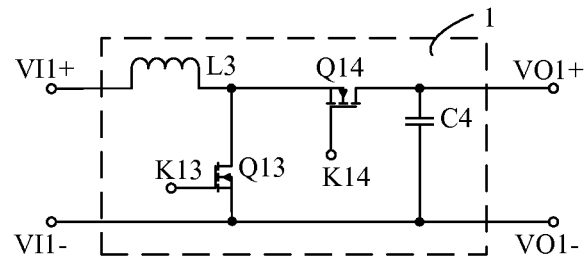
FIG. 9 is a second circuit diagram of a voltage regulator circuit 1 according to an embodiment of the present invention.

FIG. 9 shows a second specific implementation circuit of the voltage regulator circuit 1 according to an embodiment of the present invention, and for convenience of description, only a part related to the embodiment of the present invention is shown. Detailed descriptions are as follows.

In an embodiment of the present invention, as shown in FIG. 9, the voltage regulator circuit 1 has a thirteenth controlled end K13 and a fourteenth controlled end K14; and the voltage regulator circuit 1 includes a thirteenth NMOS transistor Q13, a fourteenth NMOS transistor Q14, a fourth capacitor C4, and a third inductor L3.

A first end of the third inductor L3 is the first positive electrode input end VI1+ of the voltage regulator circuit 1, a source of the thirteenth NMOS transistor Q13 is the first negative electrode input end VI1− of the voltage regulator circuit 1, a first end and a second end of the fourth capacitor C4 are the first positive electrode output end VO1+ and the first negative electrode output end VO1− of the voltage regulator circuit 1 respectively, a gate of the thirteenth NMOS transistor Q13 is the thirteenth controlled end K13 of the voltage regulator circuit 1, a gate of the fourteenth NMOS transistor Q14 is the fourteenth controlled end K14 of the voltage regulator circuit 1, a source of the fourteenth NMOS transistor Q14 is connected to a second end of the third inductor L3 and a drain of the thirteenth NMOS transistor Q13 separately, and the first end and second end of the fourth capacitor C4 are connected to a drain of the fourth NMOS transistor Q14 and the source of the thirteenth NMOS transistor Q13 respectively.

The voltage regulator circuit 1 receives a thirteenth PWM signal through the thirteenth controlled end K13, and receives a fourteenth PWM signal through the fourteenth controlled end K14, so as to output the direct current signal of the first preset voltage through the first positive electrode output end VO1+ and the first negative electrode output end VO1−.

In this embodiment, a direct current signal received through the first positive electrode input end VI1+ and the first negative electrode input end VI1− is a direct current signal in a relatively wide voltage range, but an upper limit voltage of the voltage range is less than or equal to the first preset voltage. This embodiment provides a boost circuit (formed by the thirteenth NMOS transistor Q13, the fourteenth NMOS transistor Q14, the fourth capacitor C4, and the third inductor L3), and therefore, after the thirteenth PWM signal and/or the fourteenth PWM signal is determined according to different voltages in the voltage range, it can be ensured that a voltage of a direct current signal output through the first positive electrode output end VO1+ and the first negative electrode output end VO1− is the first preset voltage, and the first preset voltage is greater than or equal to a voltage of the direct current signal received through the first positive electrode input end VI1+ and the first negative electrode input end VI1−.

Figure 10:
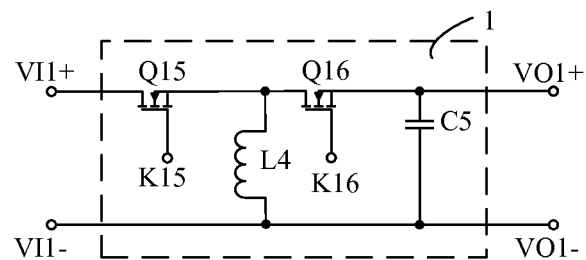
FIG. 10 is a third circuit diagram of a voltage regulator circuit 1 according to an embodiment of the present invention.

FIG. 10 shows a third specific implementation circuit of the voltage regulator circuit 1 according to an embodiment of the present invention, and for convenience of description, only a part related to the embodiment of the present invention is shown. Detailed descriptions are as follows.

In an embodiment of the present invention, as shown in FIG. 10, the voltage regulator circuit 1 has a fifteenth controlled end K15 and a sixteenth controlled end K16; and the voltage regulator circuit 1 includes a fifteenth NMOS transistor Q15, a sixteenth NMOS transistor Q16, a fifth capacitor C5, and a fourth inductor L4.

A drain of the fifteenth NMOS transistor Q15 is the first positive electrode input end VI1+ of the voltage regulator circuit 1, a second end of the fourth inductor L4 is the first negative electrode input end VI1− of the voltage regulator circuit 1, a first end and a second end of the fifth capacitor C5 are the first positive electrode output end VO1+ and the first negative electrode output end VO1− of the voltage regulator circuit 1 respectively, a gate of the fifteenth NMOS transistor Q15 is the fifteenth controlled end K15 of the voltage regulator circuit 1, a gate of the sixteenth NMOS transistor Q16 is the sixteenth controlled end K16 of the voltage regulator circuit 1, a first end of the fourth inductor L4 is connected to a source of the fifteenth NMOS transistor Q15 and a drain of the sixteenth NMOS transistor Q16 separately, a source of the sixteenth NMOS transistor Q16 is connected to the first end of the fifth capacitor C5, and the second end of the fifth capacitor C5 is connected to the second end of the fourth inductor L4.

The voltage regulator circuit 1 receives a fifteenth PWM signal through the fifteenth controlled end K15, and receives a sixteenth PWM signal through the sixteenth controlled end K16, so as to output the direct current signal of the first preset voltage through the first positive electrode output end VO1+ and the first negative electrode output end VO1−.

In this embodiment, a direct current signal received through the first positive electrode input end VI1+ and the first negative electrode input end VI1− is a direct current signal in a relatively wide voltage range, where the voltage range may include the first preset voltage, and the first preset voltage may be greater than an upper limit voltage of the voltage range, or the first preset voltage may be less than a lower limit voltage of the voltage range; with respect to a case in which the first preset voltage may be greater than, less than, or equal to a voltage of the direct current signal received through the first positive electrode input end VI1+ and the first negative electrode input end VI1−, this embodiment provides a buck-boost circuit (formed by the fifteenth NMOS transistor Q15, the sixteenth NMOS transistor Q16, the fifth capacitor C5, and the fourth inductor L4), and after the thirteenth PWM signal and/or the fourteenth PWM signal is determined according to a voltage difference between the first preset voltage and a voltage of the direct current signal received through the first positive electrode input end VI1+ and the first negative electrode input end VO1−, it can be ensured that a voltage of the direct current signal output through the first positive electrode output end VO1+ and the first negative electrode output end VO1− is the first preset voltage, that is, the voltage of the received direct current signal is increased or reduced to the first preset voltage, or maintained as the first preset voltage.

Therefore, the buck-boost circuit provided in the embodiment can implement voltage adjustment in a wider range and meet requirements of the impedance isolation circuit 2 on different first preset voltages, thereby lightening difficulty in selection of electronic parts when the impedance isolation circuit is designed.

Figure 11:
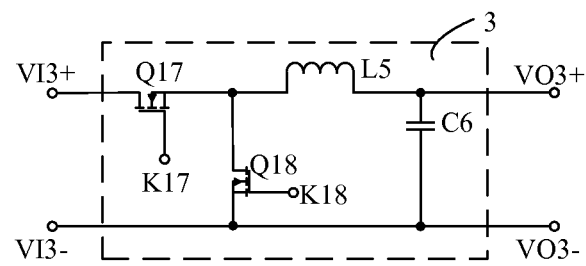
FIG. 11 is a first circuit diagram of a voltage adjustment circuit 3 according to an embodiment of the present invention.

FIG. 11 shows a first specific implementation circuit of the voltage adjustment circuit 3 according to an embodiment of the present invention, and for convenience of description, only a part related to the embodiment of the present invention is shown. Detailed descriptions are as follows.

In an embodiment of the present invention, as shown in FIG. 11, the voltage adjustment circuit 3 has a seventeenth controlled end K17 and an eighteenth controlled end K18; and the voltage adjustment circuit 3 includes a seventeenth NMOS transistor Q17, an eighteenth NMOS transistor Q18, a sixth capacitor C6, and a fifth inductor L5; a drain of the seventeenth NMOS transistor Q17 is the third positive electrode input end VI3+ of the voltage adjustment circuit 3, a source of the eighteenth NMOS transistor Q18 is the third negative electrode input end VI3− of the voltage adjustment circuit 3, a first end of the sixth capacitor C6 is the power supply end VO of the voltage adjustment circuit 3, a gate of the seventeenth NMOS transistor Q17 is the seventeenth controlled end K17 of the voltage adjustment circuit 3, a gate of the eighteenth NMOS transistor Q18 is the eighteenth controlled end K18 of the voltage adjustment circuit 3, a source of the seventeenth NMOS transistor Q17 is connected to a first end of the fifth inductor L5 and a drain of the eighteenth NMOS transistor Q18, the first end and a second end of the sixth capacitor C6 are connected to a second end of the fifth inductor L5 and the source of the eighteenth NMOS transistor Q18 respectively, and the second end of the sixth capacitor L6 is grounded; and the voltage adjustment circuit 3 receives a seventeenth PWM signal through the seventeenth controlled end K17, and receives, through the eighteenth controlled end K18, an eighteenth PWM signal of a same cycle and same timing as the seventeenth PWM signal, so as to adjust the power source signal output through the power supply end VO.

In this embodiment, because for each of the voltage adjustment circuits 3, there is one load module connected to a power supply end VO of the voltage adjustment circuit 3, the voltage adjustment circuit 3 outputs, through the power supply end VO, a direct current signal of a voltage required by the load module. Then, it is necessary to determine, according to the voltage required by the load module, the seventeenth PWM signal that controls conductivity or cut-off of the seventeenth NMOS transistor Q17 and the eighteenth PWM signal that controls conductivity or cut-off of the eighteenth NMOS transistor Q18. In this way, it can be ensured that a direct current signal output by the voltage adjustment circuit 3 has the voltage required by the load module.

In a specific implementation manner of the present invention, the voltage adjustment circuit 3 receives the seventeenth PWM signal through the seventeenth controlled end K17, and receives, through the eighteenth controlled end K18, the eighteenth PWM signal that is complementary to the seventeenth PWM signal, so as to adjust the power source signal output through the power supply end VO. In this way, the eighteenth PWM signal of a same cycle and same timing can be generated (for example, implemented by using an inverter) as long as the seventeenth PWM signal is generated, which strictly ensures that the seventeenth PWM signal and the eighteenth PWM signal are complementary and of a same cycle and same timing.

As a specific implementation manner of the present invention, with FIG. 2 and FIG. 11 used as examples, PWM signals (including the seventh PWM signal and the eighth PWM signal) used to control NMOS transistors in the impedance isolation circuit 2 and PWM signals (including the seventeenth PWM signal and the eighteenth PWM signal) used to control NMOS transistors in the voltage adjustment circuit 3 are generated by a same control module; and the control module can generate PWM signals (including the seventh PWM signal, the eighth PWM signal, the seventeenth PWM signal, and the eighteenth PWM signal) that are of a same cycle and same timing. In this way, even if a constant voltage circuit 4 is not connected in series between the impedance isolation circuit 2 and the voltage adjustment circuit 3, the voltage adjustment circuit 3 controls the seventeenth NMOS transistor Q17 by using the seventeenth PWM signal, and controls the eighteenth NMOS transistor Q18 by using the eighteenth PWM signal, and after chopping is performed in each cycle by using the seventeenth NMOS transistor Q17 and the eighteenth NMOS transistor Q18, a wave-form obtained after the chopping is a cyclic signal (of a same cycle and same timing as the PWM signals generated by the control module); and therefore, it is ensured that the power source signal output through the power supply end VO is constant, and it is ensured that the power source signal output through the power supply end VO has the voltage required by the load module.

As a specific implementation manner of the present invention, with FIG. 3 and FIG. 11 used as examples, PWM signals (including the ninth PWM signal and the tenth PWM signal) used to control NMOS transistors in the impedance isolation circuit 2 and PWM signals (including the seventeenth PWM signal and the eighteenth PWM signal) used to control the voltage adjustment circuit 3 are generated by a same control module; and the control module can generate PWM signals (including the ninth PWM signal, the tenth PWM signal, the seventeenth PWM signal, and the eighteenth PWM signal) that are of a same cycle and same timing. In this way, even if a constant voltage circuit 4 does not need to be connected in series between the impedance isolation circuit 2 and the voltage adjustment circuit 3, the voltage adjustment circuit 3 controls the seventeenth NMOS transistor Q17 by using the seventeenth PWM signal, and controls the eighteenth NMOS transistor Q18 by using the eighteenth PWM signal, and after chopping is performed in each cycle by using the seventeenth NMOS transistor Q17 and the eighteenth NMOS transistor Q18, a wave-form obtained after the chopping is a cyclic signal (of a same cycle and same timing as the PWM signals generated by the control module); and therefore, it is ensured that the power source signal output through the power supply end VO is constant, and it is ensured that the power source signal output through the power supply end VO has the voltage required by the load module.

Figure 12:
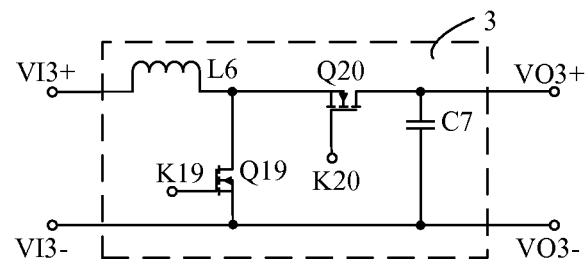
FIG. 12 is a second circuit diagram of a voltage adjustment circuit 3 according to an embodiment of the present invention.

FIG. 12 shows a second specific implementation circuit of the voltage adjustment circuit 3 according to an embodiment of the present invention, and for convenience of description, only a part related to the embodiment of the present invention is shown. Detailed descriptions are as follows.

In an embodiment of the present invention, as shown in FIG. 12, the voltage adjustment circuit 3 has a nineteenth controlled end K19 and a twentieth controlled end K20; and the voltage adjustment circuit 3 includes a nineteenth NMOS transistor Q19, a twentieth NMOS transistor Q20, a seventh capacitor C7, and a sixth inductor L6, where a first end of the sixth inductor L6 is the third positive electrode input end VI3+ of the voltage adjustment circuit 3, a source of the nineteenth NMOS transistor Q19 is the third negative electrode input end VI3− of the voltage adjustment circuit 3, a first end of the seventh capacitor C7 is the power supply end VO of the voltage adjustment circuit 3, a gate of the nineteenth NMOS transistor Q19 is the nineteenth controlled end K19 of the voltage adjustment circuit 3, a gate of the twentieth NMOS transistor Q20 is the twentieth controlled end K20 of the voltage adjustment circuit 3, a source of the twentieth NMOS transistor Q20 is connected to a second end of the sixth inductor L6 and a drain of the nineteenth NMOS transistor Q19 separately, a drain of the twentieth NMOS transistor Q20 is connected to the first end of the seventh capacitor C7, and both the source of the nineteenth NMOS transistor Q19 and a second end of the seventh capacitor C7 are grounded; and the voltage adjustment circuit 3 receives a nineteenth PWM signal through the nineteenth controlled end K19, and receives, through the twentieth controlled end K20, a twentieth PWM signal that is complementary to the nineteenth PWM signal, so as to adjust the power source signal output through the power supply end VO.

In this embodiment, because for each voltage adjustment circuit 3, there is one load module connected to a power supply end VO of the voltage adjustment circuit 3, if the voltage adjustment circuit 3 needs to output, through the power supply end VO, a direct current signal of a voltage required by the load module, it is still necessary to determine, according to the voltage required by the load module, the nineteenth PWM signal that controls conductivity or cut-off of the nineteenth NMOS transistor Q19 and the twentieth PWM signal that controls conductivity or cut-off of the twentieth NMOS transistor Q20, so as to ensure that the direct current signal output by the voltage adjustment circuit 3 has the voltage required by the load module.

In addition, it should be emphasized that the voltage adjustment circuit 3 shown in FIG. 2 is mainly used in a case in which the voltage required by the load module is greater than or equal to a voltage of the isolated direct current signal output by the impedance isolation circuit 2, and voltage boost is performed by using the voltage adjustment circuit 3 provided in FIG. 12, to meet the voltage required by the load module. If a constant voltage circuit 4 is connected in series between the voltage adjustment circuit 3 and the impedance isolation circuit 2, a voltage of a direct current signal output by the constant voltage circuit 4 is the second preset voltage, and in a case in which the second preset voltage is less than the voltage required by the load module, the voltage adjustment circuit 3 provided in FIG. 12 is still applicable.

In a specific implementation manner of the present invention, the voltage adjustment circuit 3 receives the nineteenth PWM signal through the nineteenth controlled end K19, and receives, through the twentieth controlled end K20, the twentieth PWM signal that is complementary to the nineteenth PWM signal, so as to adjust the power source signal output through the power supply end VO. In this way, the twentieth PWM signal of a same cycle and same timing can be generated (for example, implemented by using an inverter) as long as the nineteenth PWM signal is generated, which strictly ensures that the nineteenth PWM signal and the twentieth PWM signal are complementary and of a same cycle and same timing.

In a specific implementation manner of the present invention, with FIG. 2 and FIG. 12 used as examples, if no constant voltage circuit 4 is connected in series between the voltage adjustment circuit 3 and the impedance isolation circuit 2, it should be ensured that PWM signals (including the seventh PWM signal and the eighth PWM signal) used to control NMOS transistors in the impedance isolation circuit 2 and PWM signals (including the nineteenth PWM signal and the twentieth PWM signal) used to control NMOS transistors in the voltage adjustment circuit 3 are of a same cycle and same timing. Preferably, the PWM signals (including the seventh PWM signal and the eighth PWM signal) used to control the NMOS transistors in the impedance isolation circuit 2 are generated by a same control module, and the control module also generates the PWM signals (including the nineteenth PWM signal and the twentieth PWM signal) that are used to control the NMOS transistors in the voltage adjustment circuit 3 and of a same cycle and same timing. This can ensure that, after chopping is performed in each cycle by the voltage adjustment circuit 3 by using the nineteenth NMOS transistor Q19 (controlled by the nineteenth PWM signal) and the twentieth NMOS transistor Q20 (controlled by the twentieth PWM signal), a wave-form obtained after the chopping is a cyclic signal (of a same cycle and same timing as the PWM signals that the control module can generate), and further ensure that the power source signal output through the power supply end VO is constant, and ensure that the power source signal output through the power supply end VO has the voltage required by the load module.

In a specific implementation manner of the present invention, with FIG. 3 and FIG. 12 used as examples, if no constant voltage circuit 4 is connected in series between the voltage adjustment circuit 3 and the impedance isolation circuit 2, it should be ensured that PWM signals (including the ninth PWM signal and the tenth PWM signal) used to control NMOS transistors in the impedance isolation circuit 2 and PWM signals (including the nineteenth PWM signal and the twentieth PWM signal) used to control NMOS transistors in the voltage adjustment circuit 3 are of a same cycle and same timing. Preferably, the PWM signals (including the ninth PWM signal and the tenth PWM signal) used to control the NMOS transistors in the impedance isolation circuit 2 are generated by a same control module, and the control module also generates the PWM signals (including the nineteenth PWM signal and the twentieth PWM signal) that are used to control the NMOS transistors in the voltage adjustment circuit 3 and of a same cycle and same timing. This can ensure that, after chopping is performed in each cycle by the voltage adjustment circuit 3 by using the nineteenth NMOS transistor Q19 (controlled by the nineteenth PWM signal) and the twentieth NMOS transistor Q20 (controlled by the twentieth PWM signal), a wave-form obtained after the chopping is a cyclic signal (of a same cycle and same timing as the PWM signals generated by the control module), and further, ensure that the power source signal output through the power supply end VO is constant, and ensure that the power source signal output through the power supply end VO has the voltage required by the load module.

Figure 13:
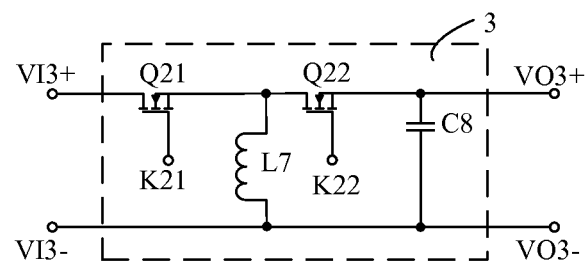
FIG. 13 is a third circuit diagram of a voltage adjustment circuit 3 according to an embodiment of the present invention.

FIG. 13 shows a third specific implementation circuit of the voltage adjustment circuit 3 according to an embodiment of the present invention, and for convenience of description, only a part related to the embodiment of the present invention is shown. Detailed descriptions are as follows.

In an embodiment of the present invention, as shown in FIG. 13, the voltage adjustment circuit 3 has a twenty-first controlled end K21 and a twenty-second controlled end K22; and the voltage adjustment circuit 3 includes a twenty-first NMOS transistor Q21, a twenty-second NMOS transistor Q22, an eighth capacitor C8, and a seventh inductor L7, where a drain of the twenty-first NMOS transistor Q21 is the third positive electrode input end VI3+ of the voltage adjustment circuit 3, a second end of the seventh inductor L7 is the third negative electrode input end VI3− of the voltage adjustment circuit 3, a first end of the eighth capacitor C8 is the power supply end VO of the voltage adjustment circuit 3, a gate of the twenty-first NMOS transistor Q21 is the twenty-first controlled end K21 of the voltage adjustment circuit 3, a gate of the twenty-second NMOS transistor Q22 is the twenty-second controlled end K22 of the voltage adjustment circuit 3, a first end of the seventh inductor L7 is connected to a source of the twenty-first NMOS transistor Q21 and a drain of the twenty-second NMOS transistor Q22 separately, a source of the twenty-second NMOS transistor Q22 is connected to the first end of the eighth capacitor C8, and both a second end of the eighth capacitor C8 and the second end of the seventh inductor L7 are grounded; and the voltage adjustment circuit 3 receives a twenty-first PWM signal through the twenty-first controlled end K21, and receives, through the twenty-second controlled end K22, a twenty-second PWM signal of a same cycle and same timing as the twenty-first PWM signal, so as to adjust the power source signal output through the power supply end VO.

In this embodiment, because for each voltage adjustment circuit 3, there is one load module connected to a power supply end VO of the voltage adjustment circuit 3, if the voltage adjustment circuit 3 needs to output, through the power supply end VO, a direct current signal of a voltage required by the load module, it is still necessary to determine, according to the voltage required by the load module, the twenty-first PWM signal that controls conductivity or cut-off of the twenty-first NMOS transistor Q21 and the twenty-second PWM signal that controls conductivity or cut-off of the twenty-second NMOS transistor Q22, so as to ensure that the direct current signal output by the voltage adjustment circuit 3 has the voltage required by the load module.

In addition, it should be emphasized that, for the voltage adjustment circuit 3 shown in FIG. 2, no matter whether the voltage required by the load module is greater than, less than, or equal to the isolated direct current signal output by the impedance isolation circuit 2, as long as voltage boost or buck is performed by using the voltage adjustment circuit 3 provided in FIG. 12, the voltage adjustment circuit 3 provided in this embodiment can output a voltage that meets the requirement of the load module. If a constant voltage circuit 4 is connected in series between the voltage adjustment circuit 3 and the impedance isolation circuit 2, a voltage of a direct current signal output by the constant voltage circuit 4 is the second preset voltage, and no matter whether the second preset voltage is greater than, less than, or equal to the voltage required by the load module, the voltage adjustment circuit 3 provided in FIG. 12 is applicable.

In a specific implementation manner of the present invention, the voltage adjustment circuit 3 receives the twenty-first PWM signal through the twenty-first controlled end K21, and receives, through the twenty-second controlled end K22, the twenty-second PWM signal that is complementary to the twenty-first PWM signal, so as to adjust the power source signal output through the power supply end VO. In this way, the twenty-second PWM signal of a same cycle and same timing can be generated (for example, being implemented by using an inverter) as long as the twenty-first PWM signal is generated, which strictly ensures that the twenty-first PWM signal and the twenty-second PWM signal are complementary and of a same cycle and same timing.

In a specific implementation manner of the present invention, with FIG. 2 and FIG. 12 used as examples, if no constant voltage circuit 4 is connected in series between the voltage adjustment circuit 3 and the impedance isolation circuit 2, it should be ensured that PWM signals (including the seventh PWM signal and the eighth PWM signal) used to control NMOS transistors in the impedance isolation circuit 2 and PWM signals (including the twenty-first PWM signal and the twenty-second PWM signal) used to control NMOS transistors in the voltage adjustment circuit 3 are of a same cycle and same timing. Preferably, the PWM signals (including the seventh PWM signal and the eighth PWM signal) used to control the NMOS transistors in the impedance isolation circuit 2 are generated by a same control module, and the control module also generates the PWM signals (including the twenty-first PWM signal and the twenty-second PWM signal) that are used to control the NMOS transistors in the voltage adjustment circuit 3 and of a same cycle and same timing. This can ensure that, after chopping is performed in each cycle by the voltage adjustment circuit 3 by using the twenty-first NMOS transistor Q21 (controlled by the twenty-first PWM signal) and the twenty-second NMOS transistor Q22 (controlled by the twenty-second PWM signal), a wave-form obtained after the chopping is a cyclic signal (of a same cycle and same timing as the PWM signals that the control module can generate), and further ensure that the power source signal output through the power supply end VO is constant, and ensure that the power source signal output through the power supply end VO has the voltage required by the load module.

In a specific implementation manner of the present invention, with FIG. 3 and FIG. 12 used as examples, if no constant voltage circuit 4 is connected in series between the voltage adjustment circuit 3 and the impedance isolation circuit 2, it should be ensured that PWM signals (including the ninth PWM signal and the tenth PWM signal) used to control NMOS transistors in the impedance isolation circuit 2 and PWM signals (including the twenty-first PWM signal and the twenty-second PWM signal) used to control NMOS transistors in the voltage adjustment circuit 3 are of a same cycle and same timing. Preferably, the PWM signals (including the ninth PWM signal and the tenth PWM signal) used to control the NMOS transistors in the impedance isolation circuit 2 are generated by a same control module, and the control module also generates the PWM signals (including the twenty-first PWM signal and the twenty-second PWM signal) that are used to control the NMOS transistors in the voltage adjustment circuit 3 and of a same cycle and same timing. This can ensure that, after chopping is performed in each cycle by the voltage adjustment circuit 3 by using the twenty-first NMOS transistor Q21 (controlled by the twenty-first PWM signal) and the twenty-second NMOS transistor Q22 (controlled by the twenty-second PWM signal), a wave-form obtained after the chopping is a cyclic signal (of a same cycle and same timing as the PWM signals that the control module can generate), and further ensure that the power source signal output through the power supply end VO is constant, and ensure that the power source signal output through the power supply end VO has the voltage required by the load module.

Figure 14:
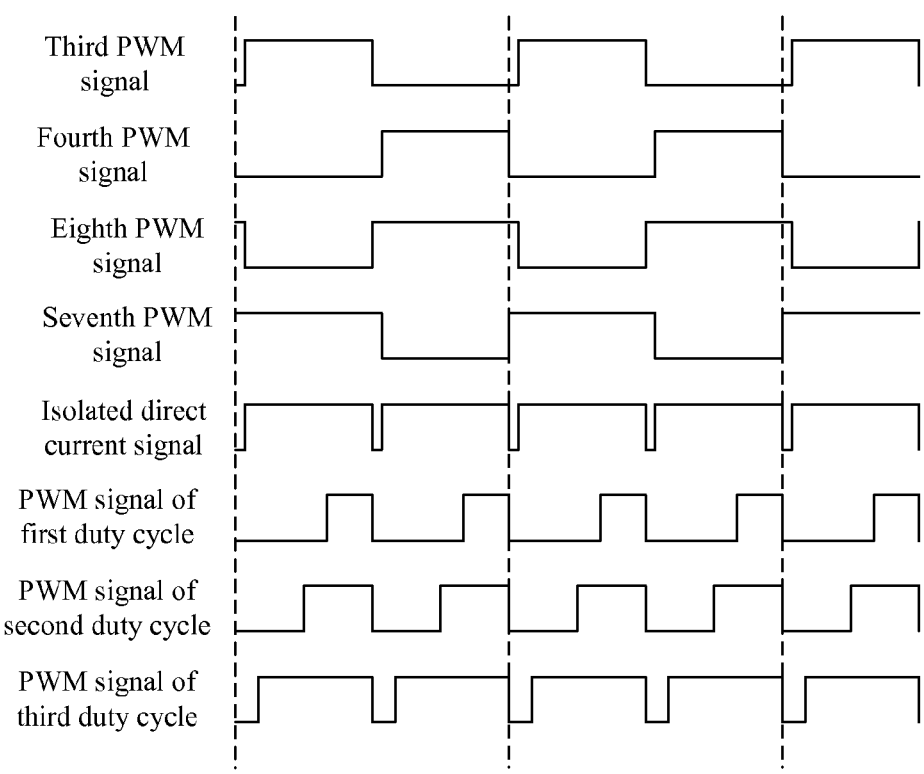
FIG. 14 is a waveform diagram of a PWM signal (including a PWM signal used to control an NMOS transistor in impedance isolation circuit 2 shown in FIG. 2, and further including a PWM signal used to control an NMOS transistor in voltage adjustment circuit 3 shown in FIG. 11).

In a specific implementation manner of the present invention, for example, the impedance isolation circuit 2 uses the circuit shown in FIG. 3, the voltage adjustment circuit 3 uses the circuit shown in FIG. 11, and the PWM signal shown in FIG. 14 is used. In the impedance isolation circuit 2, both conductivity or cut-off of the third NMOS transistor Q3 and conductivity or cut-off of the fifth NMOS transistor Q5 are controlled by the third PWM signal, both conductivity or cut-off of the fourth NMOS transistor Q4 and conductivity or cut-off of the sixth NMOS transistor Q6 are controlled by the fourth PWM signal, conductivity or cut-off of the seventh NMOS transistor Q7 is controlled by the seventh PWM signal, conductivity or cut-off of the eighth NMOS transistor Q8 is controlled by the eighth PWM signal, conductivity or cut-off of the seventeenth NMOS transistor Q17 is controlled by the seventeenth PWM signal, and conductivity or cut-off of the eighteenth NMOS transistor Q18 is controlled by the eighteenth PWM signal.

It should be emphasized that PWM signals (including the third PWM signal, the fourth PWM signal, the seventh PWM signal, and the eighth PWM signal) used to control NMOS transistors in the impedance isolation circuit 2 and PWM signals (including the seventeenth PWM signal and the eighteenth PWM signal) used to control NMOS transistors in the voltage adjustment circuit 3 must be of a same cycle and same timing.

In this way, chopping is performed by the voltage adjustment circuit 3 by using the seventeenth NMOS transistor Q17 (controlled by the seventeenth PWM signal) and the eighteenth NMOS transistor Q18 (controlled by the eighteenth PWM signal), and a wave-form obtained after the chopping is a cyclic signal (of a same cycle and same timing as the PWM signals used to control the NMOS transistors in the voltage adjustment circuit 3), that is, an electric signal in a PWM format is obtained after the chopping; and the electric signal in the PWM format is adjusted to a direct current signal by using the fifth inductor L5 and the sixth capacitor C6, where a voltage of the adjusted direct current signal is constant. Therefore, it is ensured that a power source signal output through the power supply end VO is constant, and it is ensured that the power source signal output through the power supply end VO has the voltage required by the load module.

It should be noted that, when the received eighteenth PWM signal is constant, or the received eighteenth PWM signal is a signal complementary to the seventeenth PWM signal, for different voltages required by load modules, duty cycles of the determined seventeenth PWM signal used to control conductivity or cut-off of the seventeenth NMOS transistor Q17 are also different, for example, the determined seventeenth PWM signal may be a PWM signal of a first duty cycle, a PWM signal of a second duty cycle, or a PWM signal of a third duty cycle.

When the determined seventeenth PWM signal is the PWM signal of the first duty circle, because the first duty cycle is less than the second duty cycle and the third duty cycle, a voltage of a power source signal output to the load module by a voltage adjustment module through a power supply end VO is also low.

When the determined seventeenth PWM signal is the PWM signal of the second duty circle, because the second duty cycle is less than the third duty cycle but greater than the first duty cycle, a voltage of a power source signal output to the load module by the voltage adjustment module through the power supply end VO is moderate.

When the determined seventeenth PWM signal is the PWM signal of the third duty circle, because the third duty cycle is greater than the second duty cycle and the first duty cycle, a voltage of a power source signal output to the load module by the voltage adjustment module through the power supply end VO is high.

The foregoing content further describes the present invention in detail with reference to specific exemplary implementation manners, but these descriptions should not be construed as limitations on the specific implementation of the present invention. A person of ordinary skill in the art to which the present invention belongs may make some equivalent replacements or obvious variations without departing from the principle of the present invention with the same performance or purposes, and all such replacements and variations should fall within the protection scope determined by the claims of the present invention.

What is claimed is:

1. A power supply bus circuit, comprising:
   a voltage regulator circuit;
   an impedance isolation circuit; and
   one or more voltage adjustment circuits,
   wherein the voltage regulator circuit has a first positive electrode input end, a first negative electrode input end, a first positive electrode output end, and a first negative electrode output end,
   wherein the voltage regulator circuit receives a direct current signal through the first positive electrode input end and the first negative electrode input end, adjusts a voltage of the direct current signal to a first preset voltage, and outputs a direct current signal of the first preset voltage through the first positive electrode output end and the first negative electrode output end, wherein the impedance isolation circuit has a second positive electrode input end, a second negative electrode input end, a second positive electrode output end, and a second negative electrode output end, wherein the second positive electrode input end is connected to the first positive electrode output end of the voltage regulator circuit, and the second negative electrode input end is connected to the first negative electrode output end of the voltage regulator circuit, wherein the impedance isolation circuit receives the direct current signal of the first preset voltage through the second positive electrode input end and the second negative electrode input end, adjusts the direct current signal of the first preset voltage to an alternating current signal, and outputs, by using a transformer, the alternating current signal in an isolated way and converts the alternating current signal that is output in the isolated way to an isolated direct current signal, and outputs the isolated direct current signal through the second positive electrode output end and the second negative electrode output end, wherein the voltage adjustment circuit has a third positive electrode input end, a third negative electrode input end, and a power supply end, wherein the third positive electrode input end is connected to the second positive electrode output end of the impedance isolation circuit, and the third negative electrode input end is connected to the second negative electrode output end of the impedance isolation circuit, wherein the voltage adjustment circuit receives the isolated direct current signal through the third positive electrode input end and the third negative electrode input end, chops the isolated direct current signal according to designated conduction time, converts a chopped electric signal to a power source signal of a constant direct current, and outputs the power source signal through the power supply end, wherein the impedance isolation circuit further has a third controlled end, a fourth controlled end, a fifth controlled end, a sixth controlled end, a seventh controlled end, and an eighth controlled end, wherein the impedance isolation circuit comprises a third N-type metal-oxide-semiconductor (NMOS) transistor, a fourth NMOS transistor, a fifth NMOS transistor, a sixth NMOS transistor, a seventh NMOS transistor, an eighth NMOS transistor, and the transformer, and wherein a drain of the third NMOS transistor is the second positive electrode input end of the impedance isolation circuit, a source of the sixth NMOS transistor is the second negative electrode input end of the impedance isolation circuit, a source of the eighth NMOS transistor is the second negative electrode output end of the impedance isolation circuit, a dotted end of a second secondary coil of the transformer is the second positive electrode output end of the impedance isolation circuit, a gate of the third NMOS transistor is the third controlled end of the impedance isolation circuit, a gate of the fourth NMOS transistor is the fourth controlled end of the impedance isolation circuit, a gate of the fifth NMOS transistor is the fifth controlled end of the impedance isolation circuit, a gate of the sixth NMOS transistor is the sixth controlled end of the impedance isolation circuit, a gate of the seventh NMOS transistor is the seventh controlled end of the impedance isolation circuit, a gate of the eighth NMOS transistor is the eighth controlled end of the impedance isolation circuit, a source of the third NMOS transistor is connected to a drain of the sixth NMOS transistor and an undotted end of a primary coil of the transformer separately, a drain of the fourth NMOS transistor is connected to the drain of the third NMOS transistor, a source of the fourth NMOS transistor is connected to a drain of the fifth NMOS transistor and a dotted end of the primary coil of the transformer separately, a source of the fifth NMOS transistor is connected to the source of the sixth NMOS transistor, a source of the seventh NMOS transistor is connected to the source of the eighth NMOS transistor, a drain of the eighth NMOS transistor is connected to an undotted end of the second secondary coil of the transformer, and a dotted end and an undotted end of a first secondary coil of the transformer are connected to a drain of the seventh NMOS transistor and the dotted end of the second secondary coil of the transformer respectively; and the impedance isolation circuit receives a third pulse width modulation (PWM) signal of a first preset duty cycle through the third controlled end and the fifth controlled end separately, receives, through the fourth controlled end and the sixth controlled end separately, a fourth PWM signal that differs from the third PWM signal by half a cycle, receives, through the seventh controlled end, a seventh PWM signal that is inverse to the fourth PWM signal in phase, and receives, through the eighth controlled end, an eighth PWM signal that is inverse to the third PWM signal in phase such that the second positive electrode output end and the second negative electrode output end output an isolated PWM electric signal whose duty cycle is twice the first preset duty cycle.

2. The power supply bus circuit according to claim 1, wherein the impedance isolation circuit further has a ninth controlled end, a tenth controlled end, an eleventh controlled end, and a twelfth controlled end, and wherein the impedance isolation circuit comprises a ninth NMOS transistor, a tenth NMOS transistor, an eleventh NMOS transistor, a twelfth NMOS transistor, and the transformer, wherein a tap end of a primary coil of the transformer is the second positive electrode input end of the impedance isolation circuit, a source of the ninth NMOS transistor is the second negative electrode input end of the impedance isolation circuit, a source of the twelfth NMOS transistor is connected to the second negative electrode output end of the impedance isolation circuit, a dotted end of a second secondary coil of the transformer is connected to the second positive electrode output end of the impedance isolation circuit, a gate of the ninth NMOS transistor is the ninth controlled end of the impedance isolation circuit, a gate of the tenth NMOS transistor is the tenth controlled end of the impedance isolation circuit, a gate of the eleventh NMOS transistor is the eleventh controlled end of the impedance isolation circuit, a gate of the twelfth NMOS transistor is the twelfth controlled end of the impedance isolation circuit, a drain of the ninth NMOS transistor is connected to a dotted end of the primary coil of the transformer, a drain and a source of the tenth NMOS transistor are connected to an undotted end of the primary coil of the transformer and the source of the ninth NMOS transistor respectively, a source of the eleventh NMOS transistor is connected to the source of the twelfth NMOS transistor, a drain of the twelfth NMOS transistor is connected to an undotted end of the second secondary coil of the transformer, and a dotted end and an undotted end of a first secondary coil of the transformer are connected to a drain of the eleventh NMOS transistor and the dotted end of the second secondary coil of the transformer respectively, and wherein the impedance isolation circuit receives a ninth PWM signal of a first preset duty cycle through the ninth controlled end, receives, through the tenth controlled end, a tenth PWM signal that differs from the ninth PWM signal by half a cycle, receives, through the eleventh controlled end, an eleventh PWM signal that is inverse to the tenth PWM signal in phase, and receives, through the twelfth controlled end, a twelfth PWM signal that is inverse to the ninth PWM signal in phase such that the second positive electrode output end and the second negative electrode output end output an isolated PWM electric signal whose duty cycle is twice the first preset duty cycle.

3. The power supply bus circuit according to claim 1, wherein the power supply bus circuit further comprises a constant voltage circuit, and wherein the constant voltage circuit is connected in series between the impedance isolation circuit and each of the voltage adjustment circuits, wherein the constant voltage circuit has a fourth positive electrode input end, a fourth negative electrode input end, a fourth positive electrode output end, and a fourth negative electrode output end, wherein the fourth positive electrode input end and the fourth negative electrode input end are connected to the second positive electrode output end and the second negative electrode output end of the impedance isolation circuit respectively, and the fourth positive electrode output end and the fourth negative electrode output end are connected to the third positive electrode input end and the third negative electrode input end of the voltage adjustment circuit respectively, and wherein the constant voltage circuit receives, through the fourth positive electrode input end and the fourth negative electrode input end, the isolated direct current signal output by the impedance isolation circuit, adjusts a voltage of the isolated direct current signal to a constant second preset voltage, and outputs the isolated direct current signal of the second preset voltage through the fourth positive electrode output end and the fourth negative electrode output end.

4. The power supply bus circuit according to claim 3, wherein the constant voltage circuit includes a first inductor and a first capacitor, wherein a first end and a second end of the first inductor are the fourth positive electrode input end and the fourth positive electrode output end of the constant voltage circuit respectively, a first end of the first capacitor is connected to the second end of the first inductor, a second end of the first capacitor is connected to the fourth negative electrode input end and the fourth negative electrode output end of the constant voltage circuit separately.

5. The power supply bus circuit according to claim 1, wherein the voltage regulator circuit has a first controlled end and a second controlled end, and wherein the voltage regulator circuit comprises a first NMOS transistor, a second NMOS transistor, a third capacitor, and a second inductor, wherein a drain of the first NMOS transistor is the first positive electrode input end of the voltage regulator circuit, a source of the second NMOS transistor is the first negative electrode input end of the voltage regulator circuit, a first end of the third capacitor is the first positive electrode output end of the voltage regulator circuit, a second end of the third capacitor is the first negative electrode output end of the voltage regulator circuit, a gate of the first NMOS transistor is the first controlled end of the voltage regulator circuit, a gate of the second NMOS transistor is the second controlled end of the voltage regulator circuit, a source of the first NMOS transistor is connected to a first end of the second inductor, a drain of the second NMOS transistor is connected to the first end of the second inductor, the first end and second end of the third capacitor are connected to a second end of the second inductor and the source of the second NMOS transistor respectively, and wherein the voltage regulator circuit receives a first PWM signal through the first controlled end, and receives a second PWM signal through the second controlled end to output the direct current signal of the first preset voltage through the first positive electrode output end and the first negative electrode output end.

6. The power supply bus circuit according to claim 1, wherein the voltage regulator circuit has a thirteenth controlled end and a fourteenth controlled end, and wherein the voltage regulator circuit comprises a thirteenth NMOS transistor, a fourteenth NMOS transistor, a fourth capacitor, and a third inductor, wherein a first end of the third inductor is the first positive electrode input end of the voltage regulator circuit, a source of the thirteenth NMOS transistor is the first negative electrode input end of the voltage regulator circuit, a first end and a second end of the fourth capacitor are the first positive electrode output end and the first negative electrode output end of the voltage regulator circuit respectively, a gate of the thirteenth NMOS transistor is the thirteenth controlled end of the voltage regulator circuit, a gate of the fourteenth NMOS transistor is the fourteenth controlled end of the voltage regulator circuit, a source of the fourteenth NMOS transistor is connected to a second end of the third inductor and a drain of the thirteenth NMOS transistor separately, and the first end and second end of the fourth capacitor are connected to a drain of the fourth NMOS transistor and the source of the thirteenth NMOS transistor respectively, and wherein the voltage regulator circuit receives a thirteenth PWM signal through the thirteenth controlled end, and receives a fourteenth PWM signal through the fourteenth controlled end to output the direct current signal of the first preset voltage through the first positive electrode output end and the first negative electrode output end.

7. The power supply bus circuit according to claim 1, wherein the voltage regulator circuit has a fifteenth controlled end and a sixteenth controlled end, and wherein the voltage regulator circuit comprises a fifteenth NMOS transistor, a sixteenth NMOS transistor, a fifth capacitor, and a fourth inductor, wherein a drain of the fifteenth NMOS transistor is the first positive electrode input end of the voltage regulator circuit, a second end of the fourth inductor is the first negative electrode input end of the voltage regulator circuit, a first end and a second end of the fifth capacitor are the first positive electrode output end and the first negative electrode output end of the voltage regulator circuit respectively, a gate of the fifteenth NMOS transistor is the fifteenth controlled end of the voltage regulator circuit, a gate of the sixteenth NMOS transistor is the sixteenth controlled end of the voltage regulator circuit, a first end of the fourth inductor is connected to a source of the fifteenth NMOS transistor and a drain of the sixteenth NMOS transistor separately, a source of the sixteenth NMOS transistor is connected to the first end of the fifth capacitor, and the second end of the fifth capacitor is connected to the second end of the fourth inductor, and wherein the voltage regulator circuit receives a fifteenth PWM signal through the fifteenth controlled end, and receives a sixteenth PWM signal through the sixteenth controlled end to output the direct current signal of the first preset voltage through the first positive electrode output end and the first negative electrode output end.

8. The power supply bus circuit according to claim 1, wherein the voltage adjustment circuit has a seventeenth controlled end and an eighteenth controlled end, and wherein the voltage adjustment circuit comprises a seventeenth NMOS transistor, an eighteenth NMOS transistor, a sixth capacitor, and a fifth inductor, wherein a drain of the seventeenth NMOS transistor is the third positive electrode input end of the voltage adjustment circuit, a source of the eighteenth NMOS transistor is the third negative electrode input end of the voltage adjustment circuit, a first end of the sixth capacitor is the power supply end of the voltage adjustment circuit, a gate of the seventeenth NMOS transistor is the seventeenth controlled end of the voltage adjustment circuit, a gate of the eighteenth NMOS transistor is the eighteenth controlled end of the voltage adjustment circuit, a source of the seventeenth NMOS transistor is connected to a first end of the fifth inductor and a drain of the eighteenth NMOS transistor, the first end and a second end of the sixth capacitor are connected to a second end of the fifth inductor and the source of the eighteenth NMOS transistor respectively, and the second end of the sixth capacitor is grounded, and wherein the voltage adjustment circuit receives a seventeenth PWM signal of a second preset duty cycle through the seventeenth controlled end, and receives, through the eighteenth controlled end, an eighteenth PWM signal of a same cycle and same timing as the seventeenth PWM signal to adjust the power source signal output through the power supply end.

9. The power supply bus circuit according to claim 1, wherein the voltage adjustment circuit has a nineteenth controlled end and a twentieth controlled end, and wherein the voltage adjustment circuit comprises a nineteenth NMOS transistor, a twentieth NMOS transistor, a seventh capacitor, and a sixth inductor, wherein a first end of the sixth inductor is the third positive electrode input end of the voltage adjustment circuit, a source of the nineteenth NMOS transistor is the third negative electrode input end of the voltage adjustment circuit, a first end of the seventh capacitor is the power supply end of the voltage adjustment circuit, a gate of the nineteenth NMOS transistor is the nineteenth controlled end of the voltage adjustment circuit, a gate of the twentieth NMOS transistor is the twentieth controlled end of the voltage adjustment circuit, a source of the twentieth NMOS transistor is connected to a second end of the sixth inductor and a drain of the nineteenth NMOS transistor separately, a drain of the twentieth NMOS transistor is connected to the first end of the seventh capacitor, and both the source of the nineteenth NMOS transistor and a second end of the seventh capacitor are grounded, and wherein the voltage adjustment circuit receives a nineteenth PWM signal of a third preset duty cycle through the nineteenth controlled end, and receives, through the twentieth controlled end, a twentieth PWM signal of a same cycle and same timing as the nineteenth PWM signal to adjust the power source signal output through the power supply end.

10. The power supply bus circuit according to claim 1, wherein the voltage adjustment circuit has a twenty-first controlled end and a twenty-second controlled end, and wherein the voltage adjustment circuit comprises a twenty-first NMOS transistor, a twenty-second NMOS transistor, an eighth capacitor, and a seventh inductor, wherein a drain of the twenty-first NMOS transistor is the third positive electrode input end of the voltage adjustment circuit, a second end of the seventh inductor is the third negative electrode input end of the voltage adjustment circuit, a first end of the eighth capacitor is the power supply end of the voltage adjustment circuit, a gate of the twenty-first NMOS transistor is the twenty-first controlled end of the voltage adjustment circuit, a gate of the twenty-second NMOS transistor is the twenty-second controlled end of the voltage adjustment circuit, a first end of the seventh inductor is connected to a source of the twenty-first NMOS transistor and a drain of the twenty-second NMOS transistor separately, a source of the twenty-second NMOS transistor is connected to the first end of the eighth capacitor, and both a second end of the eighth capacitor and the second end of the seventh inductor are grounded, and wherein the voltage adjustment circuit receives a twenty-first PWM signal through the twenty-first controlled end, and receives, through the twenty-second controlled end, a twenty-second PWM signal of a same cycle and same timing as the twenty-first PWM signal to adjust the power source signal output through the power supply end.

11. A power supply bus circuit, comprising:
a voltage regulator circuit;
an impedance isolation circuit; and
one or more voltage adjustment circuits,
wherein the voltage regulator circuit has a first positive electrode input end, a first negative electrode input end, a first positive electrode output end, and a first negative electrode output end,
wherein the voltage regulator circuit receives a direct current signal through the first positive electrode input end and the first negative electrode input end, adjusts a voltage of the direct current signal to a first preset voltage, and outputs a direct current signal of the first preset voltage through the first positive electrode output end and the first negative electrode output end,
wherein the impedance isolation circuit has a second positive electrode input end, a second negative electrode input end, a second positive electrode output end, and a second negative electrode output end,
wherein the second positive electrode input end is connected to the first positive electrode output end of the voltage regulator circuit, and the second negative electrode input end is connected to the first negative electrode output end of the voltage regulator circuit,
wherein the impedance isolation circuit receives the direct current signal of the first preset voltage through the second positive electrode input end and the second negative electrode input end, adjusts the direct current signal of the first preset voltage to an alternating current signal, and outputs, by using a transformer, the alternating current signal in an isolated way and converts the alternating current signal that is output in the isolated way to an isolated direct current signal, and outputs the isolated direct current signal through the second positive electrode output end and the second negative electrode output end,
wherein the voltage adjustment circuit has a third positive electrode input end, a third negative electrode input end, and a power supply end,
wherein the third positive electrode input end is connected to the second positive electrode output end of the impedance isolation circuit, and the third negative electrode input end is connected to the second negative electrode output end of the impedance isolation circuit,
wherein the voltage adjustment circuit receives the isolated direct current signal through the third positive electrode input end and the third negative electrode input end, chops the isolated direct current signal according to designated conduction time, converts a chopped electric signal to a power source signal of a constant direct current, and outputs the power source signal through the power supply end,
wherein the power supply bus circuit further comprises a constant voltage circuit, wherein the constant voltage circuit is connected in series between the impedance isolation circuit and each of the voltage adjustment circuits, wherein the constant voltage circuit has a fourth positive electrode input end, a fourth negative electrode input end, a fourth positive electrode output end, and a fourth negative electrode output end, wherein the fourth positive electrode input end and the fourth negative electrode input end are connected to the second positive electrode output end and the second negative electrode output end of the impedance isolation circuit respectively, and the fourth positive electrode output end and the fourth negative electrode output end are connected to the third positive electrode input end and the third negative electrode input end of the voltage adjustment circuit respectively, and wherein the constant voltage circuit receives, through the fourth positive electrode input end and the fourth negative electrode input end, the isolated direct current signal output by the impedance isolation circuit, adjusts a voltage of the isolated direct current signal to a constant second preset voltage, and outputs the isolated direct current signal of the second preset voltage through the fourth positive electrode output end and the fourth negative electrode output end.

12. The power supply bus circuit according to claim 11, wherein the constant voltage circuit includes a first inductor and a first capacitor, and wherein a first end and a second end of the first inductor are the fourth positive electrode input end and the fourth positive electrode output end of the constant voltage circuit respectively, a first end of the first capacitor is connected to the second end of the first inductor, a second end of the first capacitor is connected to the fourth negative electrode input end and the fourth negative electrode output end of the constant voltage circuit separately.

13. A power supply bus circuit, comprising:
a voltage regulator circuit;
an impedance isolation circuit; and
one or more voltage adjustment circuits,
wherein the voltage regulator circuit has a first positive electrode input end, a first negative electrode input end, a first positive electrode output end, and a first negative electrode output end,
wherein the voltage regulator circuit receives a direct current signal through the first positive electrode input end and the first negative electrode input end, adjusts a voltage of the direct current signal to a first preset voltage, and outputs a direct current signal of the first preset voltage through the first positive electrode output end and the first negative electrode output end,
wherein the impedance isolation circuit has a second positive electrode input end, a second negative electrode input end, a second positive electrode output end, and a second negative electrode output end,
wherein the second positive electrode input end is connected to the first positive electrode output end of the voltage regulator circuit, and the second negative electrode input end is connected to the first negative electrode output end of the voltage regulator circuit, wherein the impedance isolation circuit receives the direct current signal of the first preset voltage through the second positive electrode input end and the second negative electrode input end, adjusts the direct current signal of the first preset voltage to an alternating current signal, and outputs, by using a transformer, the alternating current signal in an isolated way and converts the alternating current signal that is output in the isolated way to an isolated direct current signal, and outputs the isolated direct current signal through the second positive electrode output end and the second negative electrode output end, wherein the voltage adjustment circuit has a third positive electrode input end, a third negative electrode input end, and a power supply end, wherein the third positive electrode input end is connected to the second positive electrode output end of the impedance isolation circuit, and the third negative electrode input end is connected to the second negative electrode output end of the impedance isolation circuit, wherein the voltage adjustment circuit receives the isolated direct current signal through the third positive electrode input end and the third negative electrode input end, chops the isolated direct current signal according to designated conduction time, converts a chopped electric signal to a power source signal of a constant direct current, and outputs the power source signal through the power supply end, wherein the voltage regulator circuit has a first controlled end and a second controlled end, wherein the voltage regulator circuit comprises a first N-type metal-oxide-semiconductor (NMOS) transistor, a second NMOS transistor, a third capacitor, and a second inductor, wherein a drain of the first NMOS transistor is the first positive electrode input end of the voltage regulator circuit, a source of the second NMOS transistor is the first negative electrode input end of the voltage regulator circuit, a first end of the third capacitor is the first positive electrode output end of the voltage regulator circuit, a second end of the third capacitor is the first negative electrode output end of the voltage regulator circuit, a gate of the first NMOS transistor is the first controlled end of the voltage regulator circuit, a gate of the second NMOS transistor is the second controlled end of the voltage regulator circuit, a source of the first NMOS transistor is connected to a first end of the second inductor, a drain of the second NMOS transistor is connected to the first end of the second inductor, the first end and the second end of the third capacitor are connected to a second end of the second inductor and the source of the second NMOS transistor respectively, and wherein the voltage regulator circuit receives a first PWM signal through the first controlled end, and receives a second PWM signal through the second controlled end to output the direct current signal of the first preset voltage through the first positive electrode output end and the first negative electrode output end.

* * * * *